(12) United States Patent
Ogawa

(10) Patent No.: US 8,384,792 B2
(45) Date of Patent: Feb. 26, 2013

(54) IMAGING APPARATUS, METHOD FOR CONTROLLING THE SAME, AND PROGRAM

(75) Inventor: Kaname Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 782 days.

(21) Appl. No.: 12/237,619

(22) Filed: Sep. 25, 2008

(65) Prior Publication Data

US 2009/0115864 A1 May 7, 2009

(30) Foreign Application Priority Data

Nov. 2, 2007 (JP) ................................ 2007-286657

(51) Int. Cl.
*H04N 5/228* (2006.01)
*G06K 9/00* (2006.01)
(52) U.S. Cl. ..................................... 348/222.1; 382/118
(58) Field of Classification Search .................. 348/161, 348/222.1, 345, 349; 396/89, 121, 123; 382/118
See application file for complete search history.

(56) References Cited

U.S. PATENT DOCUMENTS

| | | | |
|---|---|---|---|
| 6,181,805 B1 | 1/2001 | Koike et al. | |
| 7,742,079 B2 * | 6/2010 | Rainier et al. | ............. 348/222.1 |
| 2003/0071908 A1 | 4/2003 | Sannoh et al. | |
| 2006/0092292 A1 | 5/2006 | Matsuoka et al. | |
| 2006/0210264 A1 | 9/2006 | Saga | |
| 2007/0036431 A1 | 2/2007 | Terakawa | |
| 2007/0064145 A1 | 3/2007 | Sugimoto | |
| 2007/0104374 A1 | 5/2007 | Terakawa | |
| 2007/0195171 A1 | 8/2007 | Xiao et al. | |
| 2008/0008361 A1 * | 1/2008 | Nozaki et al. | ................. 382/118 |

FOREIGN PATENT DOCUMENTS

| | | |
|---|---|---|
| CN | 1764238 A | 4/2006 |
| CN | 1823298 A | 8/2006 |
| EP | 1 471 455 A2 | 10/2004 |
| JP | 2004-320287 | 11/2004 |
| JP | 2007-074141 | 3/2007 |
| JP | 2007-150601 | 6/2007 |
| JP | 2007-201980 | 8/2007 |
| JP | 207-281532 | 10/2007 |
| JP | 2007-282119 | 10/2007 |
| JP | 2008-278458 | 11/2008 |
| WO | WO 2007/060980 A1 | 5/2007 |

OTHER PUBLICATIONS

Office Action issued Mar. 18, 2010, in Chinese Patent Application No. 200810175527.2 (with English translation).
Office Action issued Aug. 24, 2011, in Chinese Patent Application No. 200810175527.2 (with English translation).
European Search Report issued Aug. 12, 2011, in European Patent Application No. 08167205.7.

* cited by examiner

*Primary Examiner* — W. B. Perkey
*Assistant Examiner* — Minh Phan
(74) *Attorney, Agent, or Firm* — Oblon, Spivak, McClelland, Maier & Neustadt, L.L.P.

(57) ABSTRACT

An imaging apparatus includes the following elements. An operation acceptance unit accepts an operation input to specify an attribute associated with a predetermined object. An imaging unit converts incoming light from a subject into a captured image. An object detection unit detects one or more objects included in the captured image. An attribute determination unit determines an attribute of each detected object. A priority object determination unit determines at least one of the detected objects as a priority object on the basis of the specified attribute and the determined attribute.

19 Claims, 17 Drawing Sheets

FIG. 3
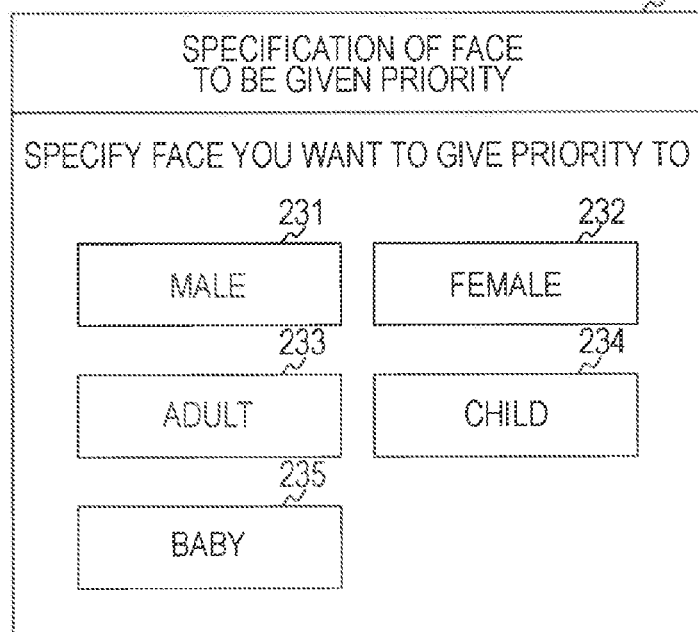
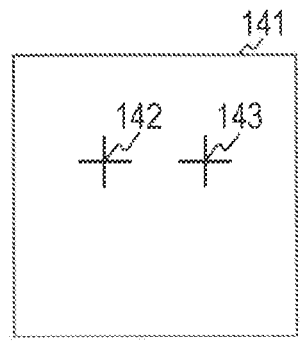
FIG. 4A
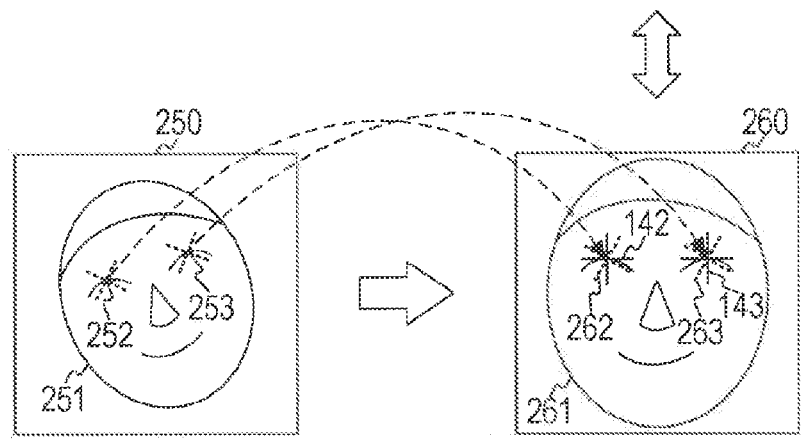
FIG. 4B

310

| | pix-generation-1 (x, y) | | pix-generation-2 (x, y) | | generation θ (THRESHOLD) | generation α (WEIGHT) |
|---|---|---|---|---|---|---|
| | x | y | x | y | | |
| 1 | ... | ... | ... | ... | ... | ... |
| 2 | ... | ... | ... | ... | ... | ... |
| ⋮ | ⋮ | ⋮ | ⋮ | ⋮ | ⋮ | ⋮ |
| t | ... | ... | ... | ... | ... | ... |

320

| | pix-gender-1 (x, y) | | pix-gender-2 (x, y) | | gender θ (THRESHOLD) | gender α (WEIGHT) |
|---|---|---|---|---|---|---|
| | x | y | x | y | | |
| 1 | ... | ... | ... | ... | ... | ... |
| 2 | ... | ... | ... | ... | ... | ... |
| ⋮ | ⋮ | ⋮ | ⋮ | ⋮ | ⋮ | ⋮ |
| t | ... | ... | ... | ... | ... | ... |

330

| | pix-baby-1 (x, y) | | pix-baby-2 (x, y) | | baby θ (THRESHOLD) | baby α (WEIGHT) |
|---|---|---|---|---|---|---|
| | x | y | x | y | | |
| 1 | ... | ... | ... | ... | ... | ... |
| 2 | ... | ... | ... | ... | ... | ... |
| ⋮ | ⋮ | ⋮ | ⋮ | ⋮ | ⋮ | ⋮ |
| t | ... | ... | ... | ... | ... | ... |

FIG. 8

| ID NUMBER 421 | ADULT/CHILD (GENERATION) 422 | MALE/FEMALE (GENDER) 423 | BABY/NON-BABY 424 | FACE SIZE 425 | FACE POSITION 426 | ... |
|---|---|---|---|---|---|---|
| 001 | CHILD | MALE | NON-BABY | ... | ... | ... |
| 002 | ADULT | MALE | NON-BABY | ... | ... | ... |
| 003 | CHILD | FEMALE | NON-BABY | ... | ... | ... |
| 004 | ADULT | FEMALE | NON-BABY | ... | ... | ... |
| ... | ... | ... | ... | ... | ... | ... |

420

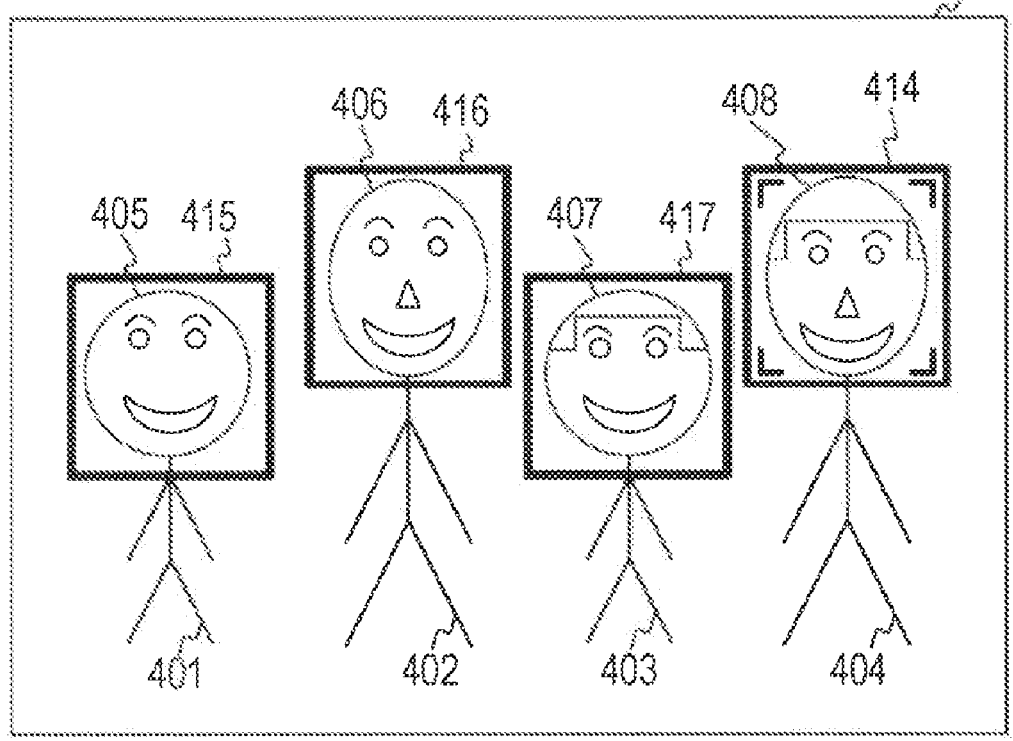
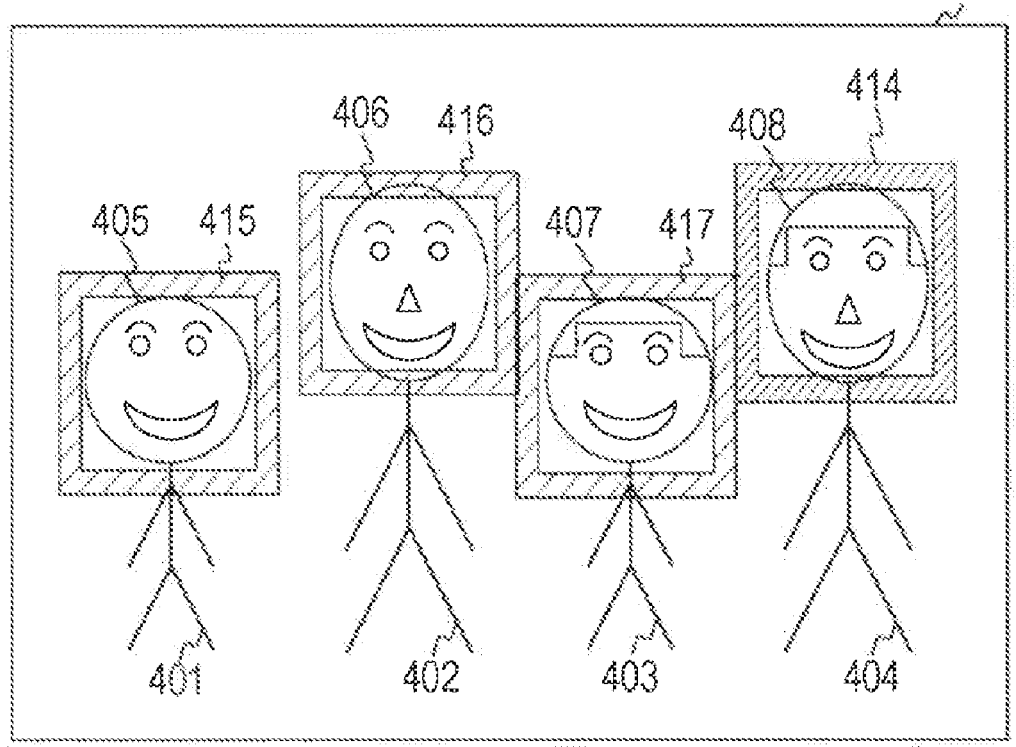

FIG. 17A

SPECIFICATION OF FACE TO BE GIVEN PRIORITY

SPECIFY FACE YOU WANT TO GIVE PRIORITY TO

- 231 MALE
- 232 FEMALE
- 233 ADULT
- 234 CHILD
- 235 BABY

FIG. 17B

SPECIFICATION OF FACIAL EXPRESSION TO BE SHOT

SPECIFY FACIAL EXPRESSION YOU WANT TO SHOOT

- 241 SMILING FACE
- 242 UNSMILING FACE
- 243 TEARFUL FACE
- 244 ANGRY FACE
- 245 MOUTH-OPENED FACE

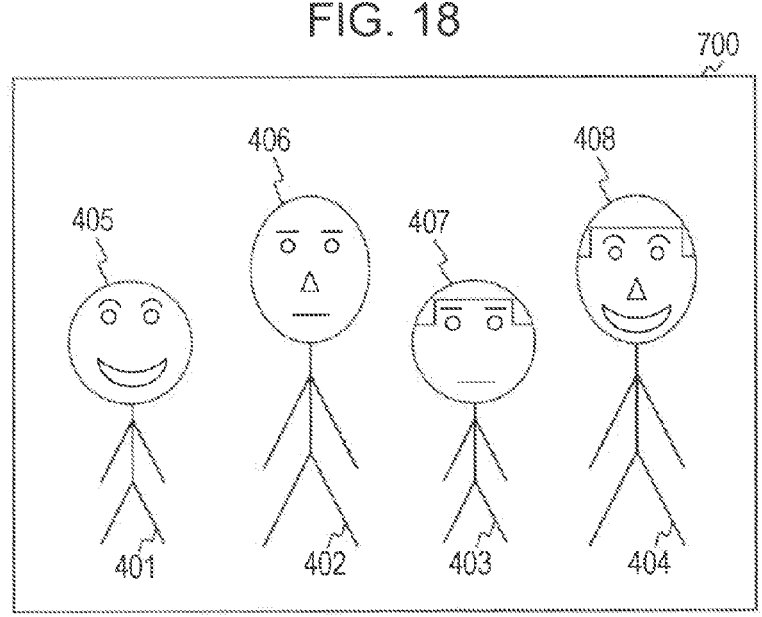

| ID NUMBER | ADULT/ CHILD (GENERATION) | MALE/ FEMALE (GENDER) | BABY/ NON-BABY | SMILING FACE/ UNSMILING FACE | TEARFUL FACE/ UNTEARFUL FACE | ANGRY FACE/ NON-ANGRY FACE | MOUTH-OPENED FACE/ MOUTH-CLOSED FACE | ... |
|---|---|---|---|---|---|---|---|---|
| 001 | CHILD | MALE | NON-BABY | SMILING FACE | UNTEARFUL FACE | NON-ANGRY FACE | MOUTH-OPENED FACE | ... |
| 002 | ADULT | MALE | NON-BABY | UNSMILING FACE | UNTEARFUL FACE | NON-ANGRY FACE | MOUTH-CLOSED FACE | ... |
| 003 | CHILD | FEMALE | NON-BABY | UNSMILING FACE | UNTEARFUL FACE | NON-ANGRY FACE | MOUTH-CLOSED FACE | ... |
| 004 | ADULT | FEMALE | NON-BABY | SMILING FACE | UNTEARFUL FACE | NON-ANGRY FACE | MOUTH-OPENED FACE | ... |
| ... | ... | ... | ... | ... | ... | ... | ... | ... |

IMAGING APPARATUS, METHOD FOR CONTROLLING THE SAME, AND PROGRAM

CROSS REFERENCES TO RELATED APPLICATIONS

The present invention contains subject matter related to Japanese Patent Application JP 2007-286657 filed in the Japanese Patent Office on Nov. 2, 2007, the entire contents of which are incorporated herein by reference.

BACKGROUND OF THE INVENTION

1. Field of the Invention

The present invention relates to imaging apparatuses, and in particular, relates to an imaging apparatus capable of detecting an object, such as a face, in a captured image, a method for controlling the imaging apparatus, and a program that allows a computer to execute the method.

2. Description of the Related Art

In recent years, imaging apparatuses, such as digital still cameras, for recording an image of a subject, such as a person, as a captured image have been widely diffused. In addition, imaging apparatuses for detecting the face of a person in a captured image and setting optimum imaging parameters used to beautifully record the detected face have been proposed. For example, there is an imaging apparatus capable of detecting the face of a person from a captured image, setting an autofocus target area on the face in the captured image on the basis of information associated with the detected face, and appropriately focusing on the face in the captured image.

In addition, there is an imaging apparatus capable of, when detecting a plurality of faces in a captured image, determining a priority face as the main face from those faces and setting the optimum imaging parameters for the priority face.

Furthermore, an imaging apparatus for detecting the face of a person shown in a captured image and calculating the final importance level of the face on the basis of size information and position information associated with the detected face to determine the importance level of the person in the captured image has been proposed (see, for example, Japanese Unexamined Patent Application Publication No. 2007-201980 (FIG. 1)).

SUMMARY OF THE INVENTION

According to the above-described related art, an importance level of the face of a person shown in a captured image can be determined with high accuracy in consideration of the size and position of the face. In addition, exposure control can be performed on the basis of a face that is determined to have a high importance level.

Assuming that a plurality of persons are photographed, in some cases, it is desirable to record a captured image in accordance with a photographer's or photographed person's preference independently of the size or position of the face of a person. For example, it is assumed that a commemorative photograph of parents and a child is taken on the day of the child's entrance ceremony. There is a high possibility that the father wants to record a captured image so that the face of the child looks the most beautiful. As for the same composition, for example, the mother may want to record the captured image so that her face looks the most beautiful.

As described above, the variety of photographer's and photographed person's preferences is quite wide. It is important to easily record a captured image according to a photographer's or photographed person's preference.

It is therefore desirable to easily record a captured image according to a user's preference.

The present invention has been made in order to solve the above-described problems. According to a first embodiment of the present invention, an imaging apparatus includes the following elements. Operation acceptance means accepts an operation input to specify an attribute associated with a predetermined object. Imaging means converts incoming light from a subject into a captured image. Object detection means detects one or more objects included in the captured image. Attribute determination means determines an attribute of each detected object. Priority object determination means determines at least one of the detected objects as a priority object on the basis of the specified attribute and the determined attribute. In this embodiment, a priority object is a predetermined object given higher priority than other predetermined objects included in a captured image. For example, the priority object is given priority in imaging control. Imaging control involving focusing and exposure is performed on the basis of the priority object. Advantageously, this embodiment has an effect of detecting one or more objects included in a captured image, determining an attribute of each detected object, and determining at least one of the detected objects as a priority object on the basis of a specified attribute and the determined attribute.

In the first embodiment of the present invention, the apparatus may further include imaging control means for setting a predetermined imaging parameter on the basis of the priority object to perform imaging control. Consequently, the first embodiment has an effect of setting a predetermined imaging parameter on the basis of a priority object to perform imaging control.

In the first embodiment, the imaging control means may set the imaging parameter on the basis of the specified attribute to perform the imaging control. Consequently, this embodiment has an effect of setting an imaging parameter on the basis of a specified attribute.

In the first embodiment, the imaging control means may set at least one of white balance, color balance, exposure, and focusing as the imaging parameter on the basis of the priority object to perform the imaging control. Consequently, this embodiment has an effect of setting at least one of white balance, color balance, exposure, and focusing as an imaging parameter on the basis of a priority object.

In the first embodiment, the apparatus may further include recording control means for recording a captured image, converted through the imaging means upon determination of the priority object, onto a predetermined recording medium. Consequently, this embodiment has an effect of recording a captured image, obtained upon determination of a priority object, onto a predetermined recording medium.

In the first embodiment, the operation acceptance means may accept an operation input to specify a plurality of attributes associated with the predetermined object, and the priority object determination means may determine the priority object on the basis of the specified attributes and the determined attributes. Consequently, this embodiment has an effect of determining a priority object on the basis of specified attributes and determined attributes.

In the first embodiment, the operation acceptance means may accept an operation input to specify a first attribute and a second attribute associated with the predetermined object, the first and second attributes belonging to two different categories, and the priority object determination means may determine the priority object on the basis of the specified first and second attributes and the determined attributes. Consequently, this embodiment has an effect of determining a priority object on the basis of specified first and second attributes and determined attributes.

In the first embodiment, the priority object determination means may select an object that has the determined attribute matching the specified attribute from the detected objects to determine the priority object. Consequently, this embodiment has an effect of selecting an object that has a determined attribute matching a specified attribute.

In the first embodiment, the object detection means may determine at least one of the size, position, and orientation of each detected object in the captured image. When selecting a plurality of objects, the priority object determination means may determine the priority object from the selected objects on the basis of at least one of the size, position, and orientation of each object. Consequently, this embodiment has an effect of determining at least one of the size, position, and orientation of each detected object in the captured image and determining a priority object from selected objects on the basis of at least one of the size, position, and orientation of each object.

In the first embodiment, the object detection means may determine the size and position of each detected object in the captured image. The apparatus may further include object position marker generation means for generating a priority-object position marker indicative of the position of the priority object in the captured image on the basis of the size and position of the priority object, superimposition means for superimposing the generated priority-object position marker on the captured image, and display means for displaying the resultant image. Consequently, this embodiment has an effect of determining the size and position of an object in a captured image, generating a priority-object position marker on the basis of the size and position of a priority object, and displaying the captured image on which the generated priority-object position marker is superimposed.

In the first embodiment, the object position marker generation means may generate an object position marker on the basis of the size and position of each detected object, the marker indicating the position of the detected object other than the priority object in the captured image and having a mode different from that of the priority-object position marker. The superimposition means may superimpose the generated object position marker on the captured image. Consequently, this embodiment has an effect of generating an object position marker on the basis of the size and position of an object and displaying a captured image on which the object position marker is superimposed.

In the first embodiment, the object may be the face of a person. Accordingly, this embodiment has an effect of detecting the face of at least one person included in a captured image, determining an attribute of the detected face, and determining at least one of the detected faces as a priority face on the basis of a specified face attribute and the determined face attribute.

According to a second embodiment of the present invention, an imaging apparatus includes the following elements. Operation acceptance means accepts an operation input to specify an attribute associated with a predetermined object. Imaging means converts incoming light from a subject into a captured image. Object detection means detects one or more objects included in the captured image. Attribute determination means determines an attribute of each detected object. Image recording instruction means selects an object that has the determined attribute matching the specified attribute from the detected objects and instructs to record a captured image, converted through the imaging means upon selection, onto a predetermined recording medium. Advantageously, this embodiment has an effect of detecting at least one object included in a captured image, determining an attribute of each detected object, selecting an object that has the determined attribute matching a specified attribute from the detected objects, and instructing to record a captured image, obtained upon selection, onto a predetermined recording medium.

In the second embodiment of the present invention, the operation acceptance means may accept an operation input to specify a plurality of attributes associated with the predetermined object. The image recording instruction means may select an object that has the determined attributes matching the specified attributes from the detected objects. Consequently, this embodiment has an effect of selecting an object that has determined attributes matching specified attributes from detected objects.

In the second embodiment, the operation acceptance means may accept an operation input to specify a first attribute and a second attribute associated with the predetermined object, the first and second attributes belonging to two different categories. The image recording instruction means may select an object that has the determined attributes matching the specified first and second attributes from the detected objects. Consequently, this embodiment has an effect of selecting an object that has determined attributes matching specified first and second attributes from detected objects.

In the second embodiment, the first attribute may be related to change on the surface of an object and the second attribute may be related to the type of object. Consequently, this embodiment has an effect of selecting an object on the basis of an attribute related to change on the surface of an object and an attribute related to the type of object.

In the second embodiment, preferably, the object is the face of a person, the first attribute is related to facial expression of a person, and the second attribute is related to the type of person. Consequently, this embodiment has an effect of selecting an object on the basis of an attribute related to facial expression of a person and an attribute related to the type of person.

According to a third embodiment of the present invention, there is provided a method for controlling an imaging apparatus having operation acceptance means for accepting an operation input to specify an attribute associated with a predetermined object. The method includes the steps of converting incoming light from a subject into a captured image, detecting one or more objects included in the captured image, determining an attribute of each detected object, and determining at least one of the detected objects as a priority object on the basis of the specified attribute and the determined attribute.

According to a fourth embodiment of the present invention, there is provided a program that allows a computer to execute a method for an imaging apparatus having operation acceptance means for accepting an operation input to specify an attribute associated with a predetermined object. The method includes the steps of converting incoming light from a subject into a captured image, detecting one or more objects included in the captured image, determining an attribute of each detected object, and determining at least one of the detected objects as a priority object on the basis of the specified attribute and the determined attribute.

Advantageously, according to any of the embodiments of the present invention, a captured image that meets a user's preference can be easily recorded.

BRIEF DESCRIPTION OF THE DRAWINGS

FIG. 3 is a diagram illustrating a display example on a liquid crystal panel 201 in accordance with the embodiment of the present invention;

FIGS. 4A and 4B are diagrams showing an example of normalization of a face image in accordance with the embodiment of the present invention;

FIG. 8 schematically shows a priority-face determination information set 420 containing results of face attribute determinations and information blocks associated with faces in accordance with the embodiment of the present invention;

FIGS. 11A and 11B show display examples of the captured image 400, in which a priority-face position marker is assigned to a priority face and face position markers are assigned to other faces, in accordance with the embodiment of the present invention;

FIGS. 17A and 17B show display examples on a liquid crystal panel 201 in accordance with the embodiment of the present invention;

FIG. 18 shows an example of an image captured through an imaging unit 110 in accordance with the embodiment of the present invention;

FIG. 19 schematically shows a face-attribute determination information set 600 containing results of face attribute determinations by an attribute determination unit 150 in accordance with the embodiment of the present invention.

DESCRIPTION OF THE PREFERRED EMBODIMENTS

Embodiments of the present invention will be described in detail with reference to the drawings.

Figure 1:
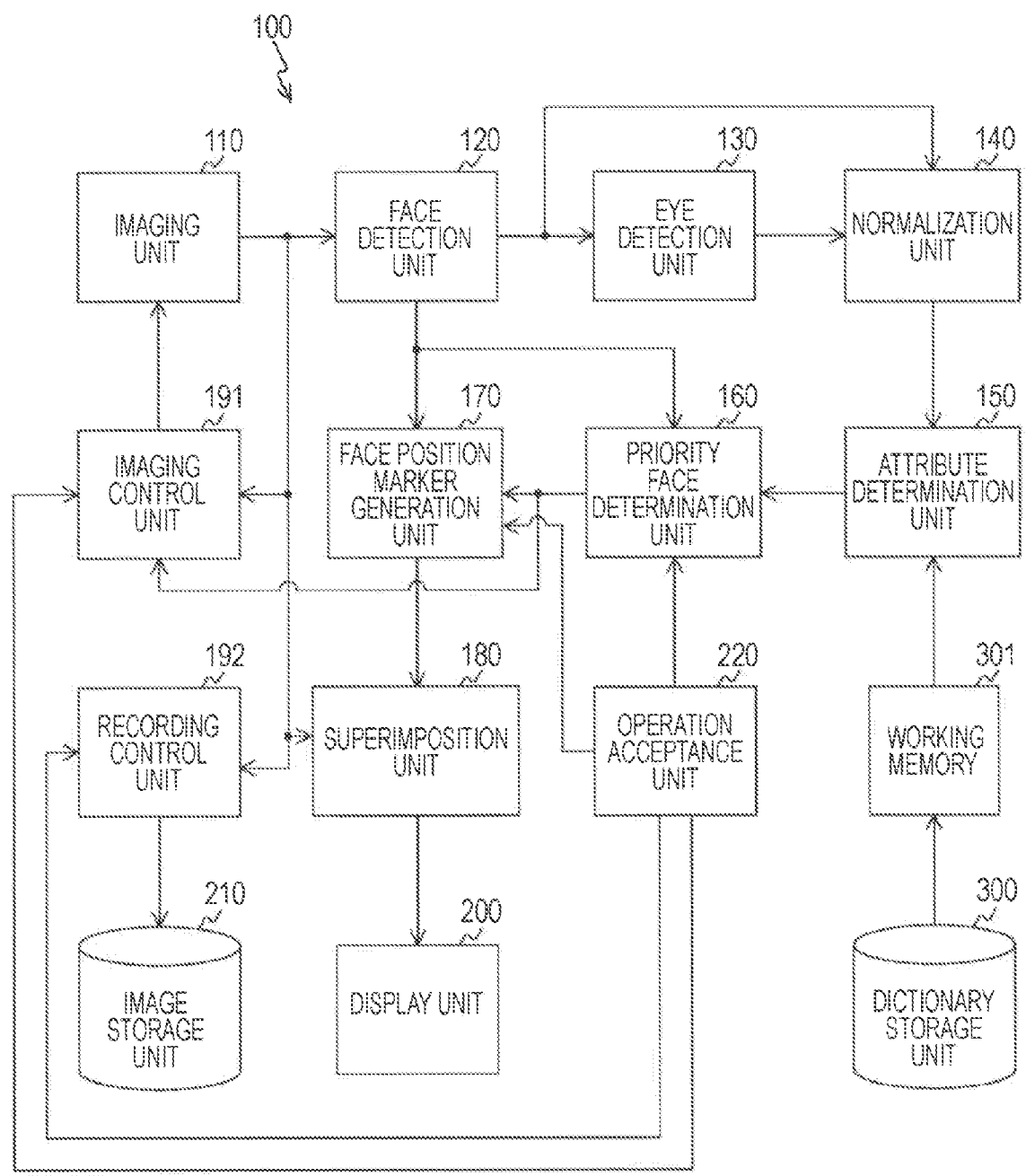
FIG. 1 is a block diagram illustrating the functional structure of an imaging apparatus 100 according to an embodiment of the present invention.

FIG. 1 is a block diagram illustrating the functional structure of an imaging apparatus 100 according to a first embodiment of the present invention. The imaging apparatus 100 includes an imaging unit 110, a face detection unit 120, an eye detection unit 130, a normalization unit 140, an attribute determination unit 150, a priority face determination unit 160, a face position marker generation unit 170, a superimposition unit 180, an imaging control unit 191, a recording control unit 192, a display unit 200, an image storage unit 210, an operation acceptance unit 220, a dictionary storage unit 300, and a working memory 301. The imaging apparatus 100 may be realized by, for example, a digital still camera having a face detecting function.

The imaging unit 110 receives incoming light, reflected from a subject, passing through an imaging lens 101 (refer to FIG. 2), converts the light into an electrical signal to generate an image signal according to the amount of received light, and performs various signal processings on the image signal. The resultant image signal is output as a captured image to the face detection unit 120, the imaging control unit 191, the recording control unit 192, and the superimposition unit 180.

Figure 7:
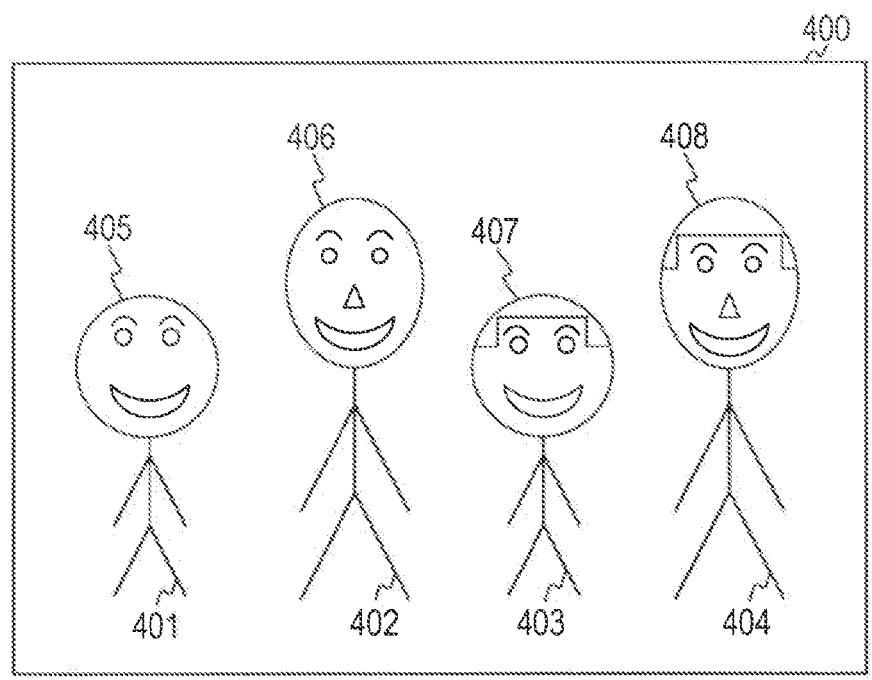
FIG. 7 shows an example of an image captured through an imaging unit 110 in accordance with the embodiment of the present invention.

The face detection unit 120 detects a face included in a captured image supplied from the imaging unit 110 and outputs a face image, serving as an image segment including the detected face in the captured image, to the eye detection unit 130 and the normalization unit 140. In addition, the face detection unit 120 outputs face information concerning the detected face to the priority face determination unit 160 and the face position marker generation unit 170. The face information concerning the detected face indicates, for example, the position, size, or orientation of the face in the captured image. When a captured image supplied from the imaging unit 110 includes a plurality of faces, the face detection unit 120 detects the faces. For example, when a captured image 400 output from the imaging unit 110 includes faces 405 to 408 of four persons as shown in FIG. 7, those faces 405 to 408 are detected. As for methods of detecting a face, for example, a method of detecting a face using matching between a template in which face brightness distribution information and an actual image and a method of detecting a face on the basis of an image segment representing a skin tone included in a captured image or an amount of feature of a human face can be used. The face detection unit 120 may detect a face having a previously specified size or a previously specified orientation from a captured image. The previously specified size can be set to, for example, a predetermined size or more in a captured image. As for the previously specified orientation, when the amount by which a detected face is close to a full-face view (hereinafter, the amount of full-face orientation) is a predetermined value or more, the face can be regarded as a face having the previously specified orientation.

The eye detection unit 130 detects both eyes included in a face image output from the face detection unit 120, and outputs information about the positions of the detected eyes in the face image to the normalization unit 140. For example, eye positions, indicated by dotted crosses 252 and 253, are detected in a face 251 included in a face image 250 shown in FIG. 4B.

The normalization unit 140 holds a normalization template and normalizes a face image output from the face detection unit 120 on the basis of the information about the positions of both eyes in the face image using the normalization template, the information being output from the eye detection unit 130. The normalization template may include, for example, a template in which the positions of both eyes in a face image are used as a reference set, as shown in FIG. 4A. The normalization unit 140 changes the resolution of a face image output from the face detection unit 120 and performs rotation and scaling on the face image so that the positions of eyes, detected by the eye detection unit 130, match the reference eye positions in the normalization template, thus normalizing the face image. The normalized face image is output to the attribute determination unit 150. The normalization of the face image and the normalization template will be described later with reference to FIGS. 4A and 4B.

The attribute determination unit 150 determines a face attribute of a normalized face image output from the normalization unit 140 using a plurality of dictionaries for determination (hereinafter, determination dictionaries) stored in the dictionary storage unit 300, and outputs the results of determinations to the priority face determination unit 160. The determination dictionaries stored in the dictionary storage unit 300 are sequentially supplied to the working memory 301 such that one determination dictionary is stored in the working memory 301. A process for face attribute determination is performed using one determination dictionary stored in the working memory 301. Specifically, the attribute determination unit 150 extracts the brightnesses of respective parts as the amounts of feature (hereinafter, feature amounts) of a normalized face image output from the normalization unit 140, and performs the face attribute determination process using the extracted brightnesses and the determination dictionary. The process for face attribute determination by the attribute determination unit 150 will be described in detail below with reference to FIGS. 6 to 8.

The dictionary storage unit 300 stores a plurality of determination dictionaries for determinations on a normalized face image output from the normalization unit 140, the determinations being performed by the attribute determination unit 150. The stored determination dictionaries are sequentially supplied to the working memory 301. Those determination dictionaries will be described in detail later with reference to FIG. 5.

The working memory 301 stores one of the determination dictionaries stored in the dictionary storage unit 300 and supplies the contents of the stored determination dictionary to the attribute determination unit 150.

The priority face determination unit 160 determines a face that meets a condition of a face attribute specified by the operation acceptance unit 220 as a priority face from among faces detected by the face detection unit 120. The priority face determination unit 160 outputs information (the position and size of the priority face) concerning the determined priority face to the face position marker generation unit 170 and the imaging control unit 191. In other words, the priority face determination unit 160 determines a priority face from among faces detected by the face detection unit 120 on the basis of a face attribute specified through the operation acceptance unit 220 and the results of face attribute determinations output from the attribute determination unit 150. Specifically, when the operation acceptance unit 220 accepts an operation input to specify a face attribute, the priority face determination unit 160 holds the specified face attribute and then selects a face that meets a condition of the held face attribute on the basis of results of face attribute determinations output from the attribute determination unit 150. In this instance, a priority face is given higher priority than other faces of persons shown in a captured image. For example, a priority face is given high priority in imaging control. The imaging control unit 191 sets imaging parameters for focusing and exposure on the basis of the priority face to perform imaging control. In display control of a captured image, the priority face is given higher priority than other faces so as to be preferentially identified by a user. When a plurality of faces meeting the condition of the held face attribute are selected as priority candidates, a priority candidate having the highest evaluation value is determined as a priority face from among those selected priority candidates. As for the evaluation value, for example, face information concerning a face detected by the face detection unit 120 is available. For example, a numerical value indicating the size of a face, a numerical value indicating the distance from a face to the center of a captured image, and a numerical value indicating the amount of full-face orientation are available. Alternatively, the sum of those numerical values may be used as an evaluation value. When one face is detected, the face is determined as a priority face. If it is difficult to select a face that meets the condition of the held face attribute on the basis of the results of face attribute determinations output from the attribute determination unit 150, a priority face is determined on the basis of an evaluation value. The determination of a priority face will be described in detail below with reference to FIGS. 7 to 9B.

The face position marker generation unit 170 generates a priority-face position marker indicating the position of a priority face in a captured image on the basis of information concerning the priority face output from the priority face determination unit 160. The face position marker generation unit 170 outputs the generated priority-face position marker to the superimposition unit 180. In addition, the face position marker generation unit 170 generates a face position marker indicating the position of a face other than the priority face in the captured image on the basis of face information concerning the other face output from the face detection unit 120, and outputs the generated face position marker to the superimposition unit 180. In this instance, the priority-face position marker and the face position marker generated by the face position marker generation unit 170 are different in mode from each other. The type of priority-face position marker or face position marker to be generated by the face position marker generation unit 170 may be changed in accordance with an operation input supplied through the operation acceptance unit 220. Types of priority-face position markers and those of face position markers and display examples will be described in detail with reference to FIGS. 9A to 11B.

The superimposition unit 180 superimposes a priority-face position marker or a face position marker output from the face position marker generation unit 170 on a captured image output from the imaging unit 110. The superimposition unit 180 outputs the resultant image, on which the priority-face position marker or face position marker is superimposed, to the display unit 200.

The imaging control unit 191 performs imaging control on an image captured through the imaging unit 110. The imaging control includes control of various imaging parameters for, for example, white balance, color balance (e.g., balance between red (R), green (G), and blue (B)), exposure, and focusing. In addition, when the priority face determination unit 160 outputs information concerning a priority face, the imaging control unit 191 performs imaging control on the basis of the information concerning the priority face. For example, the imaging control unit 191 sets the position of the priority face in a captured image as an AF area (focusing area)

and performs autofocus control. Furthermore, the imaging control unit 191 performs automatic control for white balance, color balance, and exposure so as to obtain the optimum shooting conditions for the priority face. If the priority face determination unit 160 does not output information concerning a priority face, the imaging control unit 191 performs typical imaging control without performing control targeted on a face. For example, the imaging control unit 191 performs control based on imaging conditions set through the operation acceptance unit 220.

When the operation acceptance unit 220 accepts an operation input to specify a face attribute, the imaging control unit 191 holds the specified face attribute. When the priority face determination unit 160 outputs information regarding a priority face relating to the held face attribute, the imaging control unit 191 can perform imaging control using imaging parameters for the held face attribute. For example, when "child" is specified as a face attribute, the imaging control unit 191 controls exposure such that an exposure value (EV) is set to plus ⅓ step or plus ⅔ step.

The recording control unit 192 controls the image storage unit 210 to record a captured image output from the imaging unit 110. Specifically, when the operation acceptance unit 220 accepts an operation input upon pressing a shutter release 221 (shown in FIG. 2), the recording control unit 192 allows the image storage unit 210 to record an image that is captured through the imaging unit 110 in response to the operation input and is output therefrom.

The display unit 200 displays an image output from the superimposition unit 180.

The image storage unit 210 records a captured image output from the imaging unit 110 under the control of the recording control unit 192. The image storage unit 210 may include, for example, a semiconductor memory, such as a flash memory or a disk memory card, and a permanent recording medium, such as a removable recording medium, e.g., a digital versatile disc (DVD). The image storage unit 210 may be disposed in the imaging apparatus 100 or be detachable from the imaging apparatus 100.

Figure 2A:
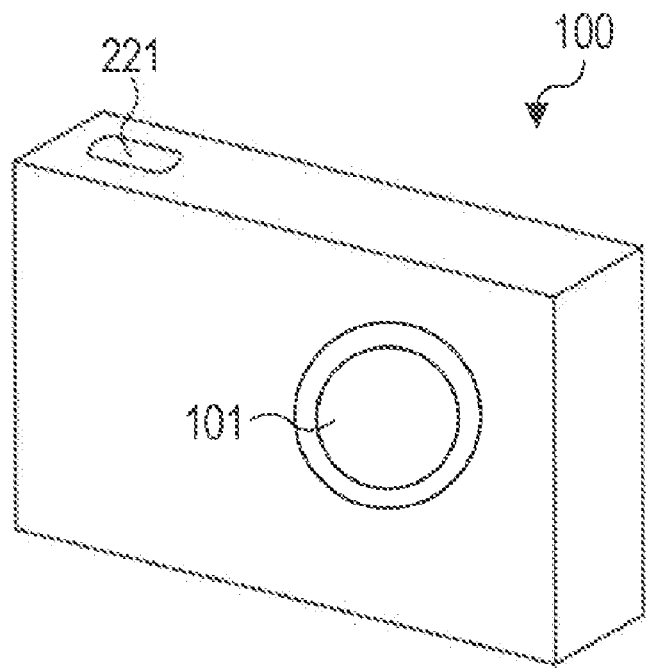
FIGS. 2A and 2B are perspective views of the imaging apparatus 100 according to the embodiment of the present invention.
Figure 2B:
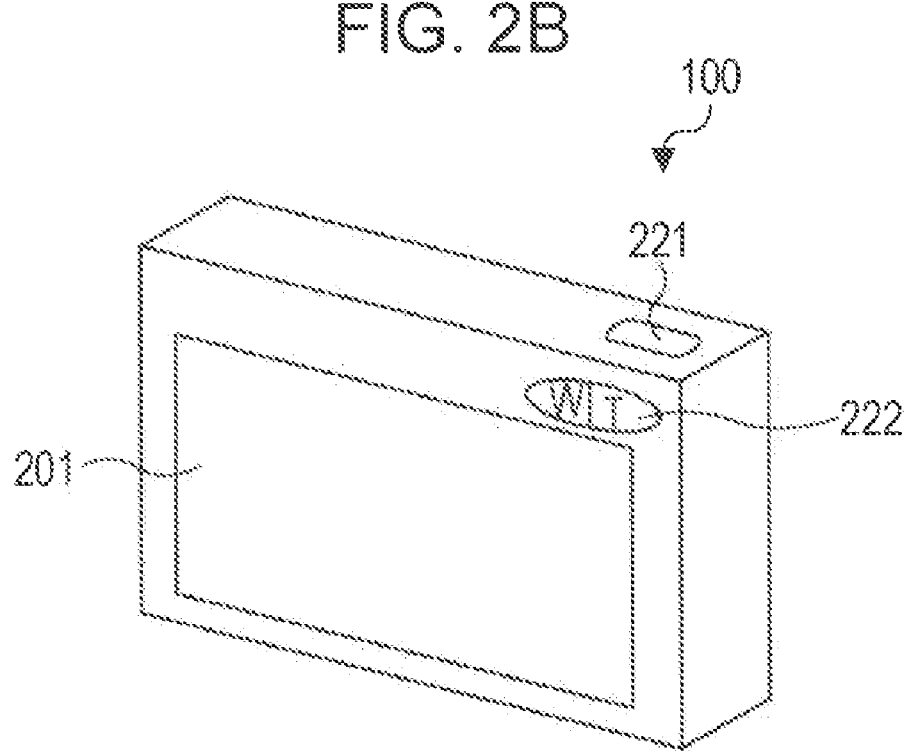

The operation acceptance unit 220 includes various operation keys and switches. When receiving an operation input through any of those keys, the operation acceptance unit 220 outputs information indicating the description of the accepted operation input to the priority face determination unit 160, the face position marker generation unit 170, and the imaging control unit 191 or the recording control unit 192. For instance, when receiving an operation input to specify a face attribute used for determining a priority face, the operation acceptance unit 220 outputs the specified face attribute to the priority face determination unit 160 and the imaging control unit 191. In addition, when receiving an operation input to specify the type of priority-face position marker or face position marker, the operation acceptance unit 220 outputs information regarding the specified type of priority-face position marker or face position marker to the face position marker generation unit 170. When receiving an operation input to set various imaging conditions according to the specified face attribute, the operation acceptance unit 220 outputs information regarding the various imaging conditions to the imaging control unit 191. In the embodiment of the present invention, as shown in FIGS. 2A and 2B, the operation acceptance unit 220 receives operation inputs entered through operating members, i.e., the shutter release 221, a zoom button 222, and a liquid crystal panel 201. In other words, the operation acceptance unit 220 is incorporated as a touch panel into the display unit 200.

FIGS. 2A and 2B are perspective views of the imaging apparatus 100 according to this embodiment of the present invention. FIG. 2A illustrates the front of the imaging apparatus 100 in which a lens is directed to a subject is arranged. FIG. 2B illustrates the rear of the imaging apparatus 100 in which the liquid crystal panel 201 directed to a photographer, i.e., the user is arranged.

The imaging apparatus 100 includes the imaging lens 101, the liquid crystal panel 201, the shutter release 221, and the zoom button 222. The shutter release 221 and the zoom button 222 correspond to the operation acceptance unit 220 shown in FIG. 1. The liquid crystal panel 201 corresponds to the display unit 200 and the operation acceptance unit 220 shown in FIG. 1. Although the imaging apparatus 100 includes other operating members, such as a power switch, as the operation acceptance unit 220, the other operating members are not shown in FIGS. 2A and 2B and description thereof is omitted.

The imaging lens 101 includes a plurality of lenses (including a zoom lens and a focus lens) for converging light from a subject. Those lenses are disposed in a housing of the imaging apparatus 100. The amount of light passing through the respective lenses (i.e., exposure) is controlled by an iris (not shown), so that the imaging unit 110 forms a captured image according to the light from the subject, the light passing through those lenses and the iris.

The liquid crystal panel 201 displays a captured image output from the imaging unit 110. In a case where the face position marker generation unit 170 generates a priority-face position marker or a face position marker, the liquid crystal panel 201 displays the capture image on which the priority-face position marker or the face position marker is superimposed. Display examples of captured images will be described in detail below with reference to FIGS. 9A to 11B. The liquid crystal panel 201 also serves as a touch panel capable of displaying various selection buttons and receiving an operation input entered by a finger touch on an area corresponding to any of those selection buttons. Display examples of the selection buttons will be described in detail below with reference to FIGS. 3, 17A, and 17B.

The shutter release 221 is pressed when the photographer intends to record a captured image. In a case where the photographer performs an imaging operation (i.e., takes a picture) using the imaging apparatus 100, the photographer recognizes a desired subject on the liquid crystal panel 201 and then presses the shutter release 221. When the shutter release 221 is pressed, a signal based on the press on the shutter release 221 is supplied from the operation acceptance unit 220 to the recording control unit 192. When receiving the signal based on the press on the shutter release 221 from the operation acceptance unit 220, the recording control unit 192 allows the image storage unit 210 to record a captured image output from the imaging unit 110 upon receiving the signal based on the press on the shutter release 221.

The zoom button 222 is operated upon controlling zoom magnification. Specifically, the zoom button 222 includes a wide-angle (W) key and a telephoto (T) key as shown in FIG. 2B. While the W key is being pressed, the zoom lens moves toward the wide-angle end (wide-angle position). While the T key is being pressed, the zoom lens moves toward the telephoto end (telephoto position).

FIG. 3 is a diagram showing a display example on the liquid crystal panel 201 in accordance with this embodiment of the present invention. Referring to FIG. 3, the liquid crystal panel 201 displays a face attribute specification window for specifying a face attribute of a priority face to be determined by the priority face determination unit 160. The face attribute specification window includes specification buttons 231 to 235. The face attribute specification window can be displayed on the liquid crystal panel 201 in accordance with, for example, a predetermined operation input entered through the operation acceptance unit 220.

In the embodiment of the present invention, a case where a face attribute related to the type of person, i.e., an attribute deeply related to a person, such as generation or gender, or a face attribute related to facial expression, such as smiling, is specified will be described. In other words, the case where at least one face attribute is specified from face attributes belonging to two different categories will be described. In this embodiment, a face attribute to be specified is associated not with a photographer but with a subject.

The specification buttons 231 to 235 are to be pressed in order to specify a face attribute of a priority face. For example, the "male" specification button 231 is used to set a male face included in a captured image as a priority face. The "female" specification button 232, the "adult" specification button 233, the "child" specification button 234, and the "baby" specification button 235 are similarly used to specify a face attribute corresponding to the characters displayed in the display area of the button.

In this example, the case where the five specification buttons for face attributes related to the type of person are displayed and any one of them is selected will be described. Another specification button for specifying another face attribute may be displayed so that the other face attribute can be specified. For example, a face attribute related to facial expression may be selected. In this example, a case where one face attribute is specified will be described. When a plurality of face attributes are specified and a face meeting conditions of the specified face attributes is determined as a priority face, this embodiment of the present invention can be applied to the case. In this case, a plurality of face attributes are specified so that the face attributes are not mutually contradictory to each other. Specifying face attributes contradictory to each other is to specify, for example, "male" and "female" or "adult" and "child".

FIGS. 4A and 4B are diagrams illustrating an example of normalization of a face image in accordance with the present embodiment of the present invention. FIG. 4A shows a normalization template 141 for normalizing a face image. FIG. 4B illustrates a transition of the face image 250 which includes the face 251 detected by the face detection unit 120. The normalization template 141 is held by the normalization unit 140 and is used for normalization by the normalization unit 140. In the normalization template 141, reference positions 142 and 143, serving as a reference set for normalization, are defined. The following description relates to a case where the resolution of the face image is changed while being subjected to rotation and scaling so that the positions of the eyes, detected by the eye detection unit 130, in the face image match the reference positions 142 and 143 in the normalization template 141.

The face image 250 including the face 251 detected by the face detection unit 120 is an image segment of a captured image output from the imaging unit 110. The eye positions 252 and 253 in the face image 250 are detected by the eye detection unit 130. In this instance, it is assumed that the center of each eye is set to the eye position. In the case where the eye positions 252 and 253 in the face image 250 are detected as described above, the eye positions 252 and 253 are transformed by, for example, affine transformation so that the eye positions 252 and 253 match the reference positions 142 and 143 in the normalization template 141 shown in FIG. 4A. For example, when the resolution of the face image 250 is changed and the face image 250 is rotated as shown in FIG. 4B, the face image 250 is normalized to generate a normalized face image 260. In the normalized face image 260, eye positions 262 and 263 match the respective reference positions 142 and 143 in the normalization template 141 shown in FIG. 4A. In this embodiment of the present invention, it is assumed that the resolution of a face image is changed to 48×48 pixels to generate a normalized face image.

As for the reference positions, the position of another feature other than the eyes of a face may be used. For example, the nose of a face may be detected and a face image may be normalized on the basis of the position of the nose. The positions of features of the face may be used as reference positions. For example, the positions of the eyes and that of the nose are available.

Figure 5:
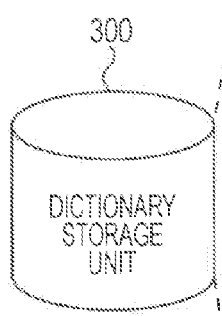
FIG. 5 is a diagram illustrating a plurality of determination dictionaries for determinations on a normalized face image in accordance with the embodiment of the present invention.

FIG. 5 illustrates a plurality of determination dictionaries for respective determinations to be performed on a normalized face image in this embodiment of the present invention. Those determination dictionaries are determination information sets for the respective determinations to be performed on a face image normalized by the normalization unit 140, the determinations being performed by the attribute determination unit 150. The determination dictionaries are stored in the dictionary storage unit 300. The embodiment will be described assuming that the determination dictionaries include a generation (adult/child) determination dictionary 310, a gender (male/female) determination dictionary 320, and a baby determination dictionary 330.

In this instance, the determination dictionaries used for face attribute determinations serve as determination information sets containing data related only to determination criteria and do not contain images. Accordingly, the storage capacity can be reduced and determinations can be performed promptly.

Each determination dictionary stores t combinations of data elements. Data elements of each combination indicate two positions pix-1 (x, y) and pix-2 (x, y) in a normalized face image, a threshold θ for the difference between a brightness at the position pix-1 (x, y) and that at the position pix-2 (x, y), and a weight α to be added or subtracted on the basis of the result of comparison between the threshold θ and the difference between the brightness at the position pix-1 (x, y) and that at the position pix-2 (x, y). Those values of respective data elements are set using the most effective top 100 combinations of data elements obtained by a machine learning algorithm, such as AdaBoost. Since the respective determination dictionaries have the same structure as described above, a plurality of determinations can be performed according to the same algorithm. Referring to FIG. 5, the data elements "pix-1 (x, y)", "pix-2 (x, y)", "θ", and "α" in the respective dictionaries are expressed by different notations. For example, in the generation determination dictionary 310, a data element "pix-1 (x, y)" is expressed as "pix-generation-1 (x, y)", a data element "pix-2 (x, y)" is expressed as "pix-generation-2 (x, y)", a data element "θ" is expressed as "generation θ", and a data element "α" is expressed as "generation α".

In this instance, a reference age in a determination using the generation determination dictionary 310 as to whether a detected face is an adult or a child may be set to, for example, 12 years old. In other words, a face that looks 12 years old or above can be determined as an "adult" and a face that looks under 12 years old can be determined as a "child". Alternatively, the generation determination can be made using another age as a reference. In addition, more detailed generation determination, for example, a determination as to whether a subject person is a child, a middle age, or an old age can be made. Furthermore, a certain range of ages is divided into groups and which group a detected face belongs to may be determined.

A case where a normalized face image is subjected to determinations using the determination dictionaries will now be described in detail with reference to FIGS. 5 and 6.

Figure 6:
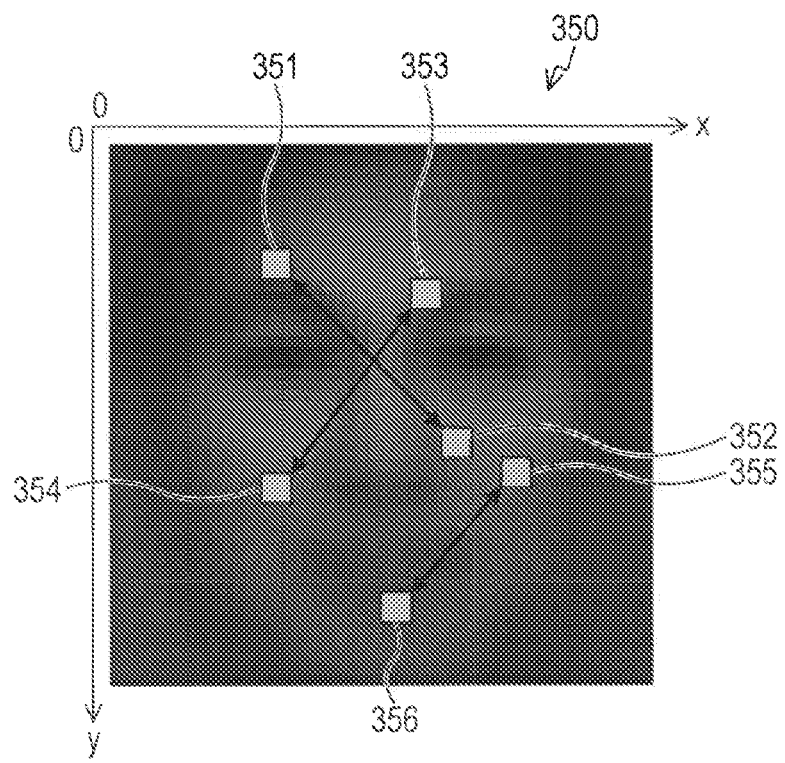
FIG. 6 shows a normalized face image 350 as an example of a face image normalized by a normalization unit 140 in accordance with the embodiment of the present invention.

FIG. 6 shows a normalized face image 350 as an example of a face image normalized by the normalization unit 140 in accordance with this embodiment of the present invention. In this example, it is assumed that the origin is defined at the left upper corner of the normalized face image 350 in FIG. 6, the horizontal axis is set to the x axis, the vertical axis is set to the y axis, and the normalized face image 350 is subjected to a determination using the generation determination dictionary 310 (refer to FIG. 5). In the normalized face image 350, for example, a position 351 is set as a position corresponding to the value of the data element "pix-generation-1 (x, y)" stored in the first row of the generation determination dictionary 310. A position 352 is set as a position corresponding to the value of the data element "pix-generation-2 (x, y)" stored in the first row thereof. A position 353 is set as a position corresponding to the value of the data element "pix-generation-1 (x, y)" stored in the second row thereof. A position 354 is set as a position corresponding to the value of the data element "pix-generation-2 (x, y)" stored in the second row thereof. A position 355 is set as a position corresponding to the value of the data element "pix-generation-1 (x, y)" stored in the third row thereof. A position 356 is set as a position corresponding to the value of the data element "pix-generation-2 (x, y)" stored in the third row thereof.

First, zero is set as the value of a score S for determination, and calculation is performed using the respective values of the data elements stored in the first row of the generation determination dictionary 310. Specifically, a brightness A(1) in the position 351 corresponding to the value of the data element "pix-generation-1 (x, y)" stored in the first row of the generation determination dictionary 310 and a brightness B(1) in the position 352 corresponding to the value of the data element "pix-generation-2 (x, y)" stored in the first row thereof are extracted. The difference C(1) between the extracted brightnesses is calculated using the following expression.

$$C(1)=A(1)-B(1)$$

Subsequently, the calculated difference C(1) between the brightnesses is compared to the value of the data element "generation θ" indicative of the threshold stored in the first row of the generation determination dictionary 310. In other words, whether the value of the difference C(1) is less than that of the threshold "generation θ" is determined. When the difference C(1) is less than the threshold "generation θ", the value of the data element "generation α" indicative of the weight stored in the first row of the generation determination dictionary 310 is added to the score S. On the other hand, when the difference C(1) is not less than the threshold "generation θ", the weight "generation α" in the first row of the generation determination dictionary 310 is subtracted from the score S.

After that, the above-described calculations are repeated using the respective values of the data elements stored in the second row of the generation determination dictionary 310. Specifically, a brightness A(2) in the position 353 corresponding to the value of the data element "pix-generation-1 (x, y)" stored in the second row of the generation determination dictionary 310 and a brightness B(2) in the position 354 corresponding to the value of the data element "pix-generation-2 (x, y)" stored in the second row thereof are extracted. The difference C(2) between the extracted brightnesses is calculated using the following expression.

$$C(2)=A(2)-B(2)$$

Subsequently, the calculated difference C(2) between the brightnesses is compared to the value of the threshold "generation θ" stored in the second row of the generation determination dictionary 310. In other words, whether the calculated difference C(2) is less than the threshold "generation θ" is determined. When the difference C(2) is less than the threshold "generation θ", the weight "generation α" stored in the second row of the generation determination dictionary 310 is added to the score S. On the other hand, when the difference C(2) is not less than the threshold "generation θ", the weight "generation α" in the second row of the generation determination dictionary 310 is subtracted from the score S.

After that, the above-described calculations are repeated using the respective values of the data elements in each of the third to t-th rows of the generation determination dictionary 310.

In other words, to make a determination on the normalized face image 350 using the generation determination dictionary 310, the difference C(i) is calculated with the following Expression (1) using the respective values of the data elements stored in each of the first to t-th rows of the generation determination dictionary 310. Whether the calculated difference C(i) satisfies the following Expression (2) is determined. In this instance, the variable i is an integer ranging from 1 to t.

$$C(i)=A(i)-B(i) \quad (1)$$

$$C(i)<\theta(i) \quad (2)$$

When the calculated difference C(i) satisfies Expression (2), the weight α(i) is added to the score S. When the calculated difference C(i) does not satisfy Expression (2), the weight α(i) is subtracted from the score S. In this instance, let A(i) be a brightness corresponding to the data element "pix-generation-1 (x, y)" stored in the i-th row, let B(i) be a brightness corresponding to the data element "pix-generation-2 (x, y)" stored in the i-th row, let θ(i) be a threshold "generation θ" stored in the i-th row, and let α(i) be a weight "generation α" stored in the i-th row.

After calculations using the respective values of the data elements stored in the t-th row of the generation determination dictionary 310, whether the score S is greater than 0 is determined.

For example, it is assumed that a learning sample obtained upon successful adult determination is learned as a positive value and a learning sample obtained upon unsuccessful adult determination is learned as a negative value according to the above-described machine learning algorithm. After the calculations using the respective values of the data elements stored in the first to t-th rows of the generation determination dictionary 310, if the score S is greater than 0, a normalized face image subjected to the determination is determined as a target image. In other words, in the determination using the normalization determination dictionary 310, a face included in the normalized face image subjected to the determination is determined as an adult face. The same applies to the other determination dictionaries. For example, in a determination using the gender determination dictionary 320, assuming that a learning sample obtained upon determination in which a face is successfully determined as a male face is learned as a positive value, when the score S is greater than 0, a face included in a normalized face image subjected to the determination is determined as a male face. Furthermore, in a determination using the baby determination dictionary 330, assuming that a learning sample obtained upon determination in which a face is successfully determined as a baby face is learned as a positive value, when the score S is greater than 0, a face included in a normalized face image subjected to the determination is determined as a baby face.

On the other hand, assuming that a learning sample obtained upon successful determination is learned as a positive value and a learning sample obtained upon unsuccessful determination is learned as a negative value according to the above-described machine learning algorithm, when the score S is not greater than 0 after the calculations using the respective values of the data elements stored in the first to t-th rows of the determination dictionary, a normalized face image subjected to the determination is determined as a nontarget image. For example, in a determination using the normalization determination dictionary 310, assuming that a learning sample of successful adult determination is learned as a positive value, when the score S is less than 0, a face included in a normalized face image subjected to the determination is determined as a child face. In addition, in a determination using the gender determination dictionary 320, assuming that a learning sample of successful male determination is learned as a positive value, when the score S is less than 0, a face included in a normalized face image subjected to the determination is determined as a female face. In a determination using the baby determination dictionary 330, assuming that a learning sample of successful baby determination is learned as a positive value, when the score S is less than 0, a face included in a normalized face image subjected to the determination is determined as a non-baby face.

In this embodiment of the present invention, the explanation is made with respect to the case where the score S is compared to 0 in a determination using any of the determination dictionaries. A value other than zero may be used for determination. In other words, a value to be compared to the score S may be appropriately adjusted.

In this instance, the score S, obtained after calculations using the respective values of the data elements stored in each of the first to t-th rows of the determination dictionary, can be expressed as the following expression:

$$S = \sum_{i=1}^{t} [\text{sign}(\theta(i) - pix1(i) + pix2(i)) \times \alpha(i)]$$

where sign(x) represents a function that is equal to 1 when x>0, and is equal to −1 when x≦0.

As described above, the resolution of a normalized face image subjected to determination is set to the same value, and a feature amount for determination is standardized to the difference between brightnesses at two points of the normalized face image. Consequently, any of the determination dictionaries can be switched to another one. A plurality of attribute information blocks can be generated according to the same algorithm.

Determinations in a case where a captured image includes a plurality of faces will now be described with reference to the drawings.

FIG. 7 is a diagram illustrating an image captured through the imaging unit 110 in accordance with the embodiment of the present invention. The captured image 400 shown in FIG. 7 is obtained by, for example, taking a picture of a family composed of four persons through the imaging apparatus 100. The captured image 400 shows a son 401, a father 402, a daughter 403, and a mother 404. In the captured image 400, the son 401, the father 402, the daughter 403, and the mother 404 have faces 405, 406, 407, and 408, respectively. The son 401 and the daughter 403 are children under 12 years old and are each determined as a "child".

When the captured image includes a plurality of faces as shown in FIG. 7, the face detection unit 120 detects the respective faces. For example, the faces 405 to 408 are detected from the captured image 400. Face images corresponding to the detected faces are normalized and the normalized face images are subjected to face attribute determination.

FIG. 8 is a diagram schematically showing results of face attribute determinations by the attribute determination unit 150 in accordance with the embodiment of the present invention and a priority-face determination information set 420 containing information blocks concerning the faces detected by the face detection unit 120. The priority-face determination information set 420 is held by the priority face determination unit 160.

The priority-face determination information set 420 contains identification (ID) numbers 421, attribute information "adult/child (generation)" 422, attribute information "male/female (gender)" 423, attribute information "baby/non-baby" 424, face information "face size" 425, and face information "face position" 426 such that each ID number are related to the corresponding information blocks.

The ID numbers 421 are assigned to faces detected by the face detection unit 120. For example, an ID number "001" is assigned to the face 405 of the son 401, an ID number "002" is assigned to the face 406 of the father 402, an ID number "003" is assigned to the face 407 of the daughter 403, and an ID number "004" is assigned to the face 408 of the mother 404.

The attribute information "adult/child (generation)" 422, the attribute information "male/female (gender)" 423, and the attribute information "baby/non-baby" 424 correspond to results of face attribute determinations by the attribute determination unit 150 using the respective determination dictionaries. For example, as for the attribute information "adult/child (generation)" 422, information "adult" or "child" is stored as each of the results of determination on the faces 405 to 408 shown in FIG. 7 using the generation determination dictionary 310. As for the attribute information "male/female (gender)" 423, information "male" or "female" is stored as each of the results of determination on the faces 405 to 408 shown in FIG. 7 using the gender determination dictionary 320. As for the attribute information "baby/non-baby" 424, information "baby" or "non-baby" is stored as each of the results of determination on the faces 405 to 408 shown in FIG. 7 using the baby determination dictionary 330.

The face information "face size" 425 and the face information "face position" 426 concern faces detected by the face detection unit 120. For example, as for the face information "face size" 425, information indicating the size of each of the faces 405 to 408, shown in FIG. 7, detected by the face detection unit 120 is stored. As for the face information "face position" 426, information indicating the position of each of the faces 405 to 408 detected by the face detection unit 120 is stored.

The priority face determination unit 160 determines a priority face from the faces detected by the face detection unit 120 using the respective information blocks contained in the priority-face determination information set 420.

For example, assuming that the "adult" specification button 233 is pressed in the liquid crystal panel 201 shown in FIG. 3 so that "adult" is specified as a face attribute of a priority face, the faces related to information "adult" stored as the attribute information "adult/child (generation)" 422 are selected as priority candidates. If the number of selected priority candidates is one, this selected priority candidate is determined as a priority face. When a plurality of priority candidates are selected, a priority face is determined on the basis of information blocks concerning the faces corresponding to the selected priority candidates. For example, the detected face having the largest size can be determined as a priority face on the basis of the sizes of the faces stored as the face information blocks "face size" 425. Alternatively, the detected face located in the nearest position to the center of the captured image can be determined as a priority face on the basis of the face information blocks "face position" 426.

Figure 9A:
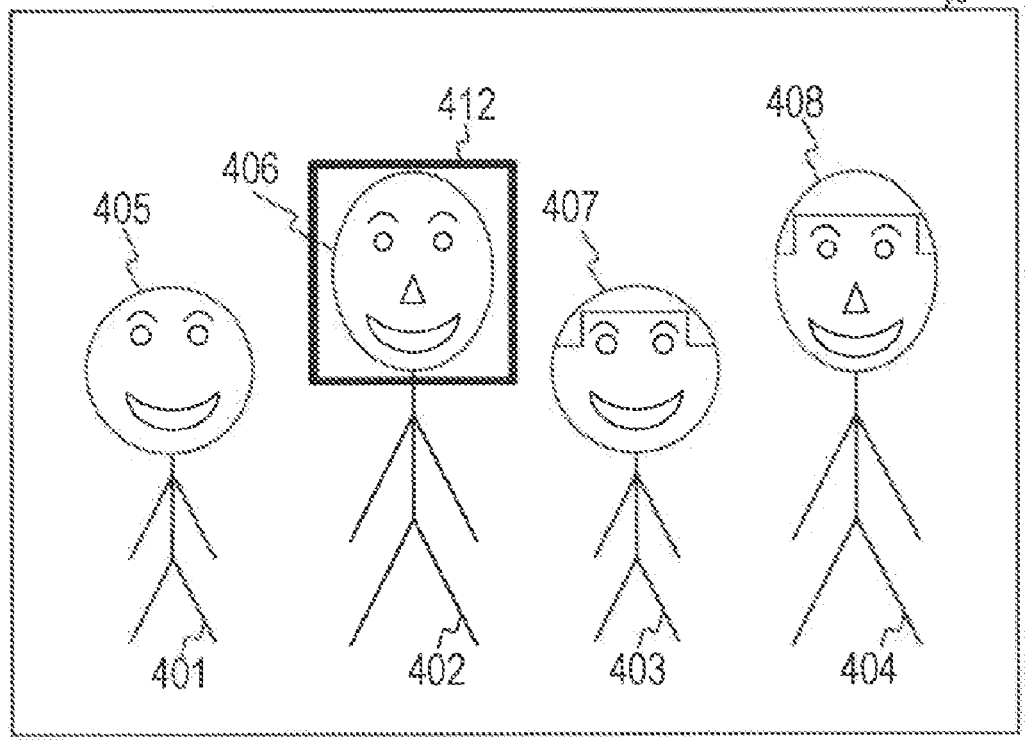
FIGS. 9A and 9B show display examples of a captured image 400, in which a priority-face position marker is assigned to a determined priority face, in accordance with the embodiment of the present invention.

In this instance, how to determine a priority face in the captured image 400 in FIG. 7 using the face positions stored as the face information blocks "face position" 426 on the assumption that "adult" is specified as a face attribute of the priority face will be described. Since the captured image 400 of FIG. 7 includes the two adults (i.e., the father 402 and the mother 404), the stored attribute information blocks "adult/child (generation)" 422 associated with the faces of the two adult persons each indicate "adult". When the position of the face 406 of the father 402 is compared with that of the face 408 of the mother 404 in the captured image 400, the face 406 of the father 402 is located closer to the center of the captured image 400 than the face 408 of the mother 404. Accordingly, although the face 406 of the father 402 and the face 408 of the mother 404 are selected as priority candidates, the face 406 of the father 402 located in the position closer to the center is determined as a priority face. FIG. 9A shows a display example in which the face 406 of the father 402 is determined as a priority face in that manner.

Figure 9B:
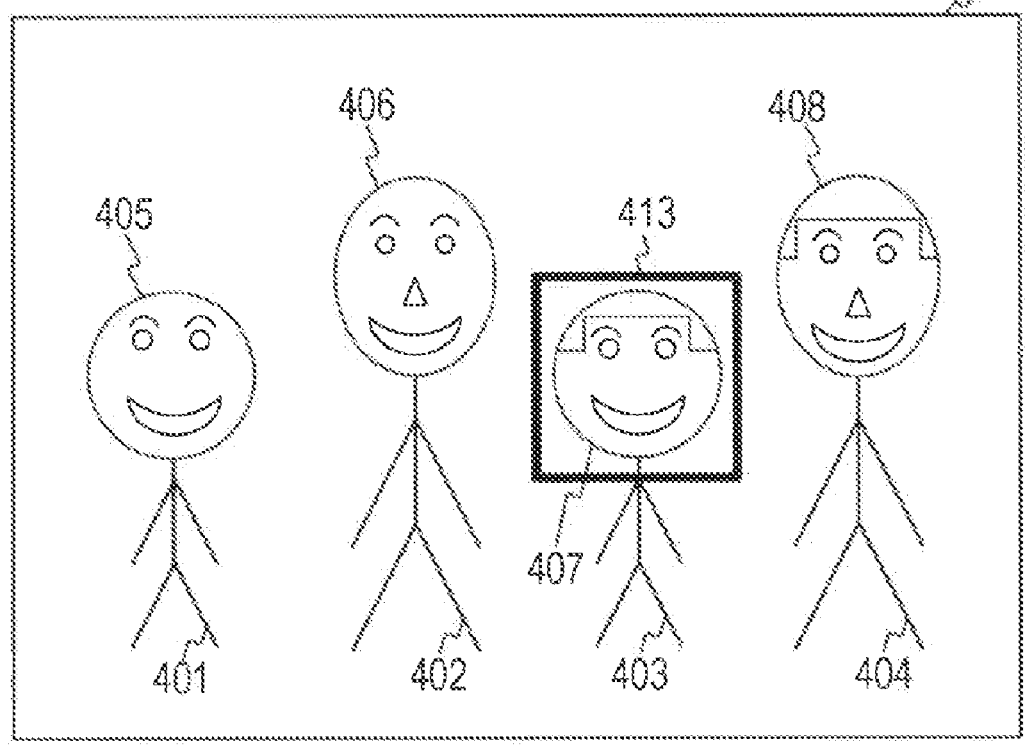

Similarly, how to determine a priority face in the captured image 400 in FIG. 7 using the face positions stored as the face information blocks "face position" 426 on the assumption that the "child" specification button 234 is pressed on the liquid crystal panel 201 shown in FIG. 3 so that "child" is specified as a face attribute of the priority face will be described. Since the captured image 400 of FIG. 7 shows the two children (i.e., the son 401 and the daughter 403), the stored attribute information blocks "adult/child (generation)" 422 associated with the faces of the two children each indicate "child". In addition, when the position of the face 405 of the son 401 is compared to that of the face 407 of the daughter 403 in the captured image 400, the face 407 of the daughter 403 is located closer to the center of the captured image 400 than the face 405 of the son 401. Accordingly, although the face 405 of the son 401 and the face 407 of the daughter 403 are selected as priority candidates, the face 407 of the daughter 403 located closer to the center of the captured image 400 is determined as a priority face. FIG. 9B shows a display example in which the face 407 of the daughter 403 is determined as the priority face in that manner.

The scores S calculated by the determinations may be stored as the results of face attribute determination by the priority-face determination information set 420. When a plurality of priority candidates are selected, the priority candidate having the highest score S can be determined as a priority face.

FIGS. 9A and 9B show the display examples of the captured image 400 in which a priority-face position marker is assigned to a determined priority face in the captured image 400 in accordance with the embodiment of the present invention. FIG. 9A illustrates the display example in which the face 406 of the father 402 is determined as a priority face in the captured image 400. FIG. 9B illustrates the display example in which the face 407 of the daughter 403 is determined as a priority face in the captured image 400.

Referring to FIGS. 9A and 9B, each of priority-face position markers 412 and 413 can be assigned to the priority face so as to the priority face and face position markers are not assigned to the faces other than the priority face. When the priority face is changed to another face, the priority-face position marker is shifted to the changed priority face.

FIGS. 10A, 10B, 11A, and 11B show other display examples of the captured image 400 in accordance with the embodiment of the present invention. In each display example, a priority-face position marker is assigned to a determined priority face and face position markers are assigned to the other faces in the captured image 400. In FIGS. 10A to 11B, it is assumed that the face 408 of the mother 404 is determined as a priority face in the captured image 400.

Figure 10A:
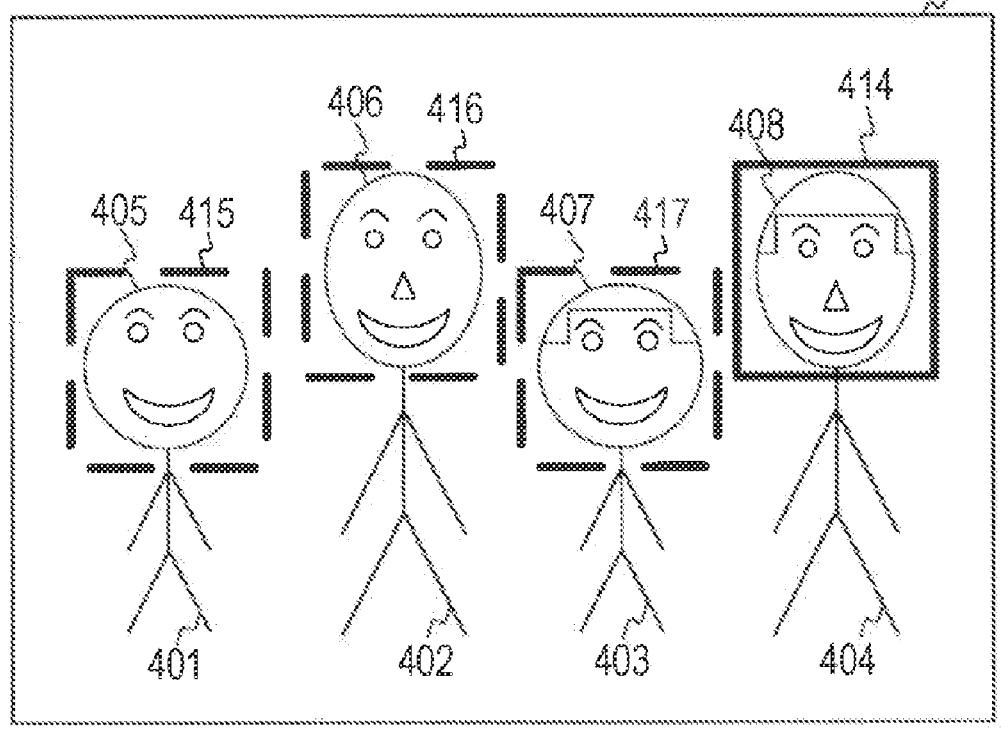
FIGS. 10A and 10B show display examples of the captured image 400, in which a priority-face position marker is assigned to a priority face and face position markers are assigned to other faces, in accordance with the embodiment of the present invention.

Referring to FIG. 10A, a priority-face position marker 414, serving as a solid rectangular frame is assigned to the priority face 408 so as to surround the face 408 and face position markers 415 to 418, each serving as a broken rectangular frame, are assigned to the faces 405 to 407, respectively.

Figure 10B:
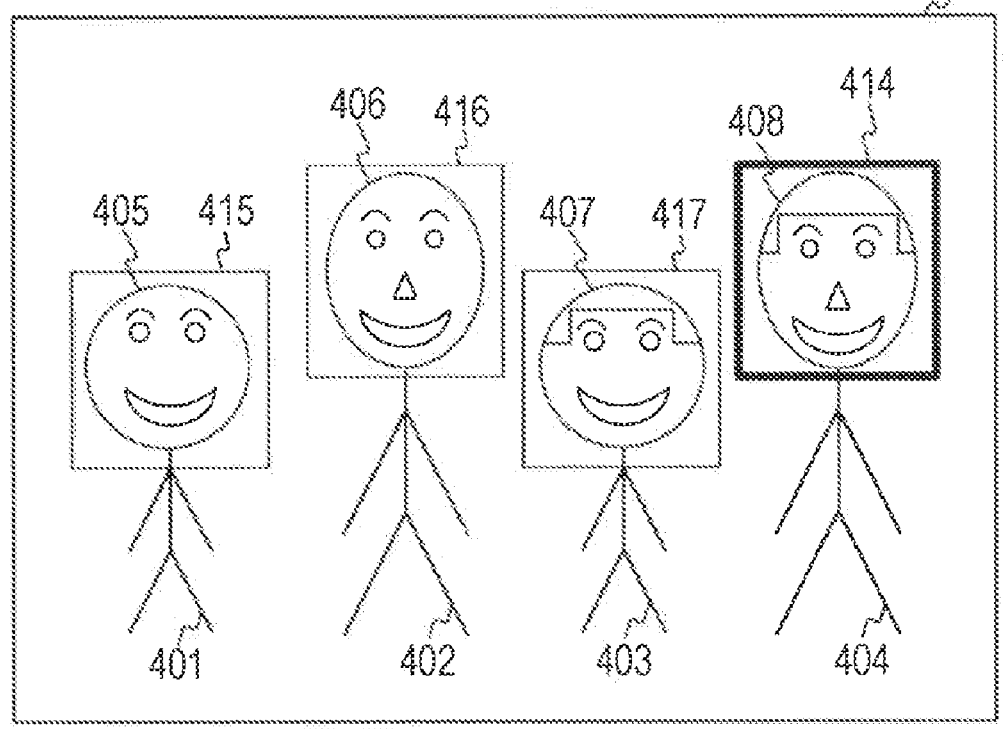

Referring to FIG. 10B, the priority-face position marker 414, serving as a solid, bold rectangular frame, is assigned to the face 408 so as to surround the face and the face position markers 415 to 417, each serving as a solid, thin rectangular frame, are assigned to the faces 405 to 407, respectively.

Referring to FIG. 11A, the priority-face position marker 414, serving as a solid rectangular frame with four corner marks, is assigned to the face 408 so as to surround the face and the face position markers 415 to 417, each serving as a solid rectangular frame, are assigned to the faces 405 to 407, respectively. In this example, the corner marks are assigned to the four corners of the frame, respectively, as shown in FIG. 11A. Any mark is not assigned to central part of each side of the frame.

Referring to FIG. 11B, the priority-face position marker 414 has a transmission different from those of the face position markers 415 to 417, and the priority-face position marker 414 and the face position markers 415 to 417 are assigned to the priority face 408 and the other faces 405 to 407, respectively. For example, the transmission of the priority-face position marker 414 assigned to the priority face is lowered so as to display the dark marker and the transmission of each of the face position markers 415 to 417 assigned to the respective faces other than the priority face is raised to display the light marker.

As described above, the priority-face position marker assigned to the priority face is displayed so as to be different from the face position markers assigned to the other faces, so that the priority face can be easily identified. In addition, the faces other than the priority face can be easily identified. The display pattern of the markers is switched to another one in accordance with an operation input entered through the operation acceptance unit 220.

The priority-face position marker and the face position markers can be displayed using a pattern different from those shown in FIGS. 9A to 11B so that they are distinguished from each other. For example, the markers can be identified using different modes, e.g., different colors, blinking and non-blinking states, or different brightnesses and colors inside and outside the markers. As for the shape of each marker, so long as each marker can indicate the position of a target face, another shape may be used. For example, a circle, an oval, or an arrow pointing a target face may be used.

An operation of the imaging apparatus 100 according to the present embodiment of the present invention will now be described with reference to the drawings.

Figure 12:
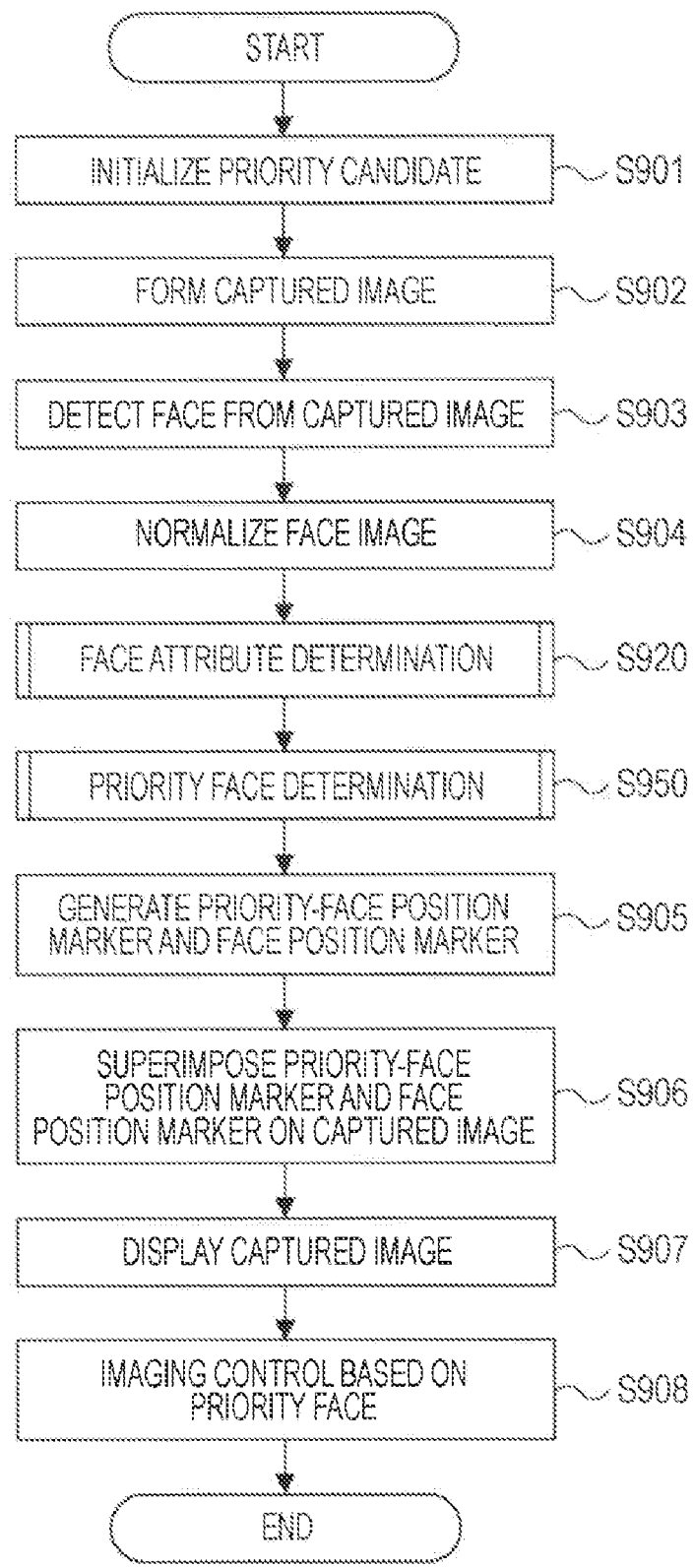
FIG. 12 is a flowchart showing a process for imaging control by the imaging apparatus 100 according to the embodiment of the present invention.

FIG. 12 is a flowchart showing a process for imaging control by the imaging apparatus 100 according to this embodiment of the present invention. A case where the imaging control unit 191 performs imaging control on the basis of a determined priority face will now be described. It is assumed that the priority face determination unit 160 holds a face attribute specified through the operation acceptance unit 220.

First, a priority candidate is initialized (step S901). Subsequently, the imaging unit 110 converts incoming light from a subject into an electrical signal, thus forming a captured image (step S902). The face detection unit 120 detects the face of at least one person, i.e., one or more faces shown in the captured image (step S903). Face information is also detected by the face detection. After that, the eye positions in an image segment (hereinafter, "face image") corresponding to each detected face are detected and the normalization unit 140 normalizes the face image on the basis of the detected eye positions (step S904).

The attribute determination unit 150 determines a face attribute with respect to each normalized face image (step S920). The face attribute determination will be described in detail below with reference to FIG. 13.

The priority face determination unit 160 determines a priority face from the faces detected by the face detection unit 120 on the basis of the results of face attribute determinations obtained by the attribute determination unit 150 (step S950). The priority face determination will be described in detail below with reference to FIG. 15.

The face position marker generation unit 170 generates a priority-face position marker on the basis of information concerning the determined priority face and further generates a face position marker on the basis of face information concerning at least one face other than the priority face (step S905). The superimposition unit 180 superimposes the generated priority-face position marker and face position marker on the captured image (step S906). The resultant image, on which the priority-face position marker and the face position marker are superimposed, is displayed on the display unit 200 (step S907).

The imaging control unit 191 performs imaging control on the basis of the determined priority face (step S908). When the priority face is determined, the priority face determination unit 160 may give an instruction to record the captured image to the recording control unit 192 so that the captured image is recorded. Alternatively, when the priority face is determined, the priority face determination unit 160 may output a voice message so as to inform the user of the determination of the priority face.

Figure 13:
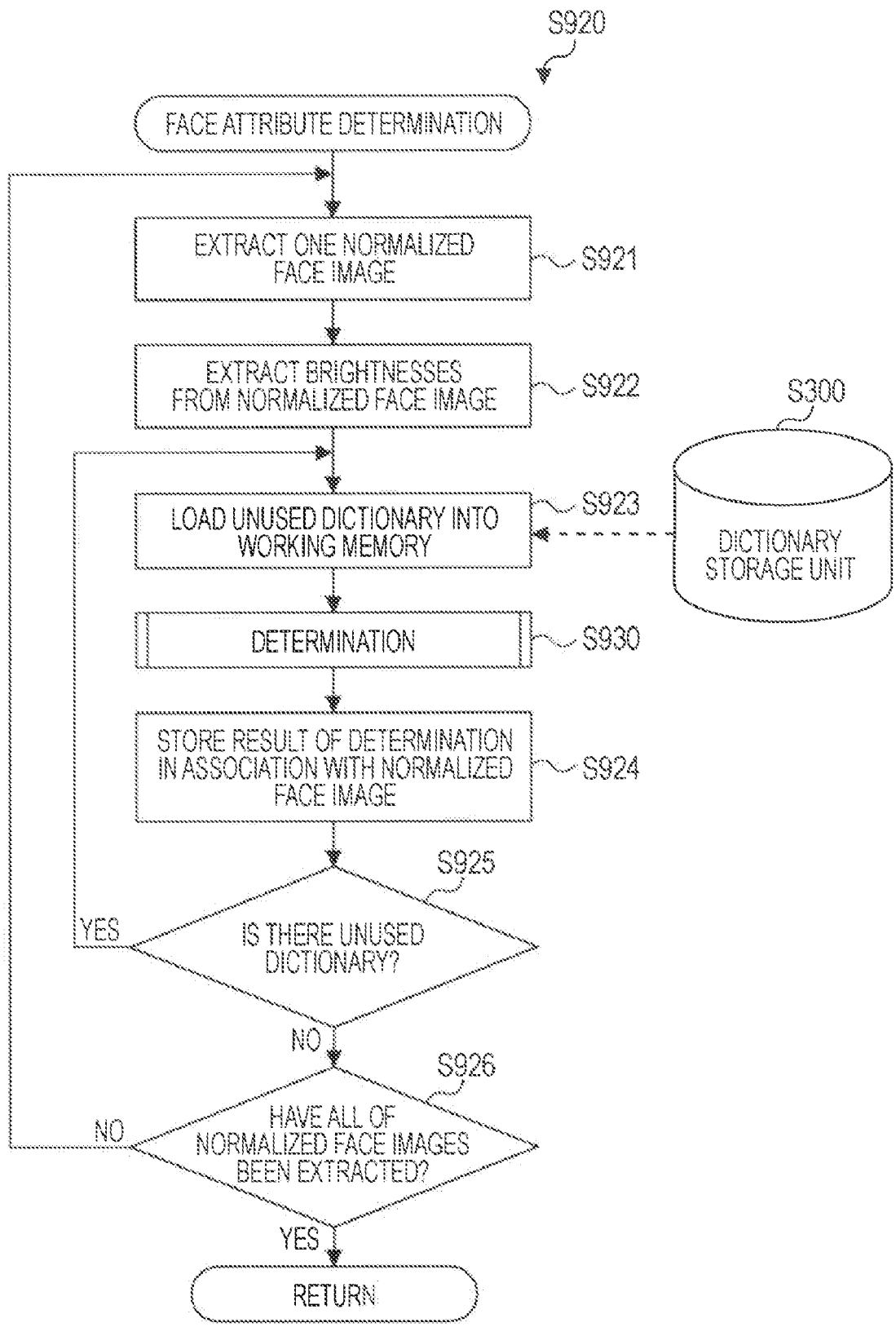
FIG. 13 is a flowchart showing a process for face attribute determination in the process for imaging control by the imaging apparatus 100 according to the embodiment of the present invention.

FIG. 13 is a flowchart showing a process for face attribute determination (step S920 in FIG. 12) in the process for imaging control by the imaging apparatus 100 according to the present embodiment of the present invention. The following description relates to a case where all of determination dictionaries are used to determine a face attribute. A face attribute may be determined using one determination dictionary.

First, one normalized face image is extracted from among normalized face images output from the normalization unit 140 (step S921). Subsequently, brightnesses are extracted from the obtained normalized face image (step S922). After that, a determination dictionary that is not yet used for determination is loaded into the working memory 301 from the dictionary storage unit 300 which stores a plurality of determination dictionaries (step S923). Subsequently, a face attribute is determined using the determination dictionary loaded in the working memory 301 (step S930). The determination will be described in detail later with reference to FIG. 14.

The result of determination of the face attribute is stored as face attribute information associated with the face subjected to the determination (step S924). Subsequently, a determination is made as to whether any of the determination dictionaries stored in the dictionary storage unit 300 is not yet used for determination (step S925). When there is an unused determination dictionary in the dictionary storage unit 300 (YES in step S925), the process is returned to step S923 and the processing steps, i.e., steps S923, S930, and S924 are repeated to make a face attribute determination on the same face. Whereas, when there is no unused determination dictionary in the dictionary storage unit 300 (NO in step S925), a determination is made as to whether all of normalized face images output from the normalization unit 140 have already been extracted (step S926).

When all of the normalized face images output from the normalization unit 140 have not been extracted (NO in step S926), the process is returned to step S921 and the processing steps, i.e., steps S921, S922, S923, S930, S924, and S925 for face attribute determination are repeated. Whereas, if all of the normalized face images output from the normalization unit 140 have already been extracted (YES in step S926), the process is returned to step S920 in FIG. 12.

Figure 14:
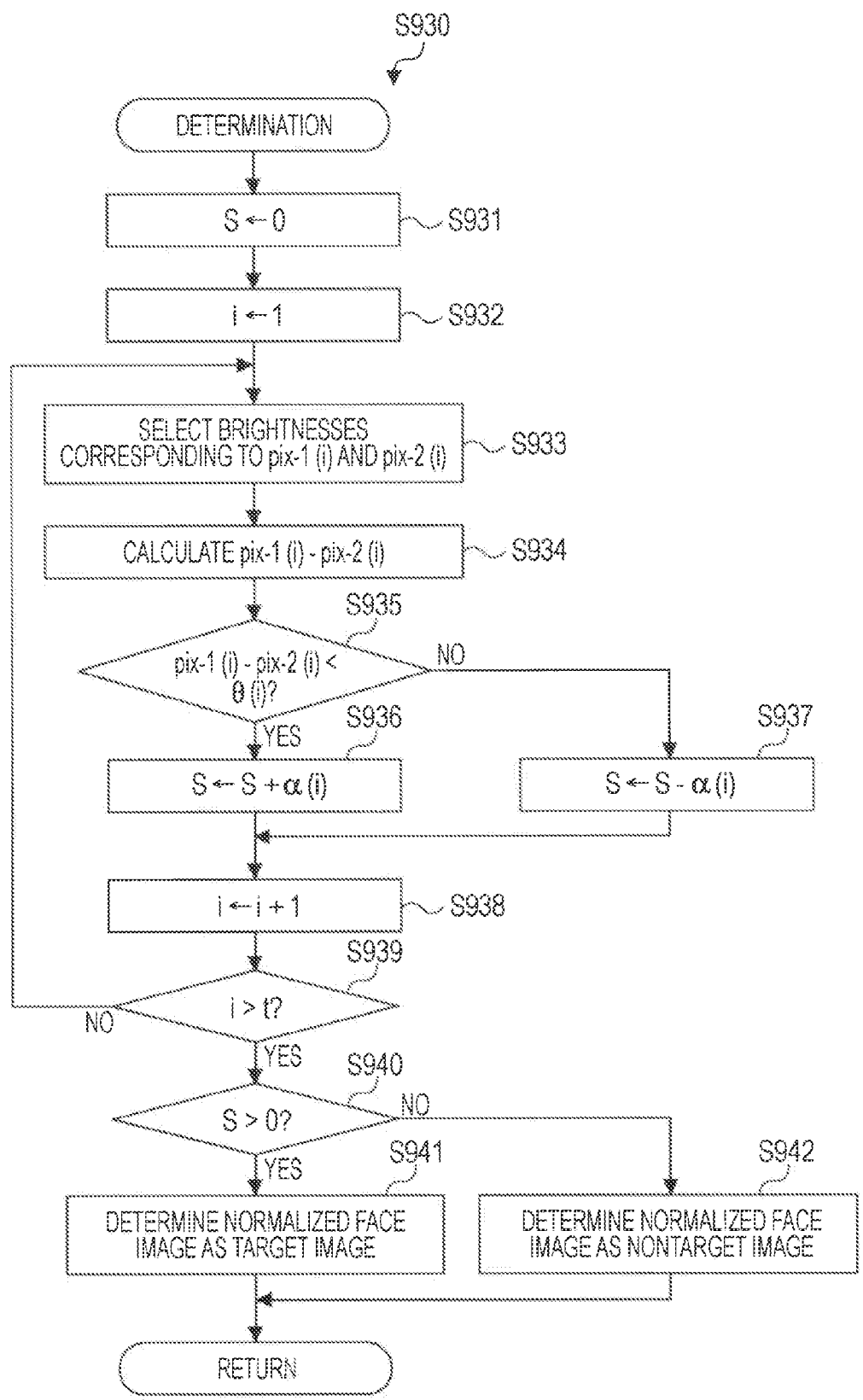
FIG. 14 is a flowchart showing a process for determination in the process for face attribute determination by the imaging apparatus 100 according to the embodiment of the present invention.

FIG. 14 is a flowchart showing a process for determination (step S930 in FIG. 13) in the process for face attribute determination by the imaging apparatus 100 according to this embodiment of the present invention. The embodiment of the present invention will be described with respect to a determination as to whether a normalized face image is a target image.

First, the score S is initialized to "0" (step S931). The variable i is initialized to "1" (step S932). Subsequently, brightnesses corresponding to the positions pix-1 (x, y) and pix-2 (x, y) in the i-th row of the determination dictionary loaded in the working memory 301 are selected out of brightnesses extracted from the normalized face image (step S933). After that, the difference C(i) is calculated with the two selected brightnesses using Expression (1) (step S934).

Subsequently, a determination is made as to whether the calculated difference C(i) between the two brightnesses is less than the threshold θ(i) (step S935). When the difference C(i) is less than the threshold θ(i) (YES in step S935), the weight α(i) is added to the score S (step S936). Whereas, when the difference C(i) is not less than the threshold θ(i) (NO in step S935), the weight α(i) is subtracted from the score S (step S937).

After that, a value of "1" is added to the variable i (step S938). A determination is made as to whether the variable i is greater than the upper limit t (step S939). When the variable i is not greater than the upper limit t (NO in step S939), this means that the determination using the values in each row of the determination dictionary loaded in the working memory 301 is not finished. Accordingly, the process is returned to step S933 and steps S933 to S938 are repeated using the same determination dictionary. Whereas, when the variable i is greater than the upper limit t (YES in step S939), this means that the determination using the values in each row of the determination dictionary loaded in the working memory 301 is finished. Accordingly, the process proceeds to step S940. A determination is made as to whether the score S is greater than 0 (step S940).

When the score S is greater than 0 (YES in step S940), the normalized face image subjected to the determination is determined as a target image (step S941). Whereas, when the score S is not greater than 0 (NO in step S940), the normalized face image subjected to the determination is determined as a nontarget image (step S942). After that, the process is returned to step S930 in FIG. 13.

Figure 15:
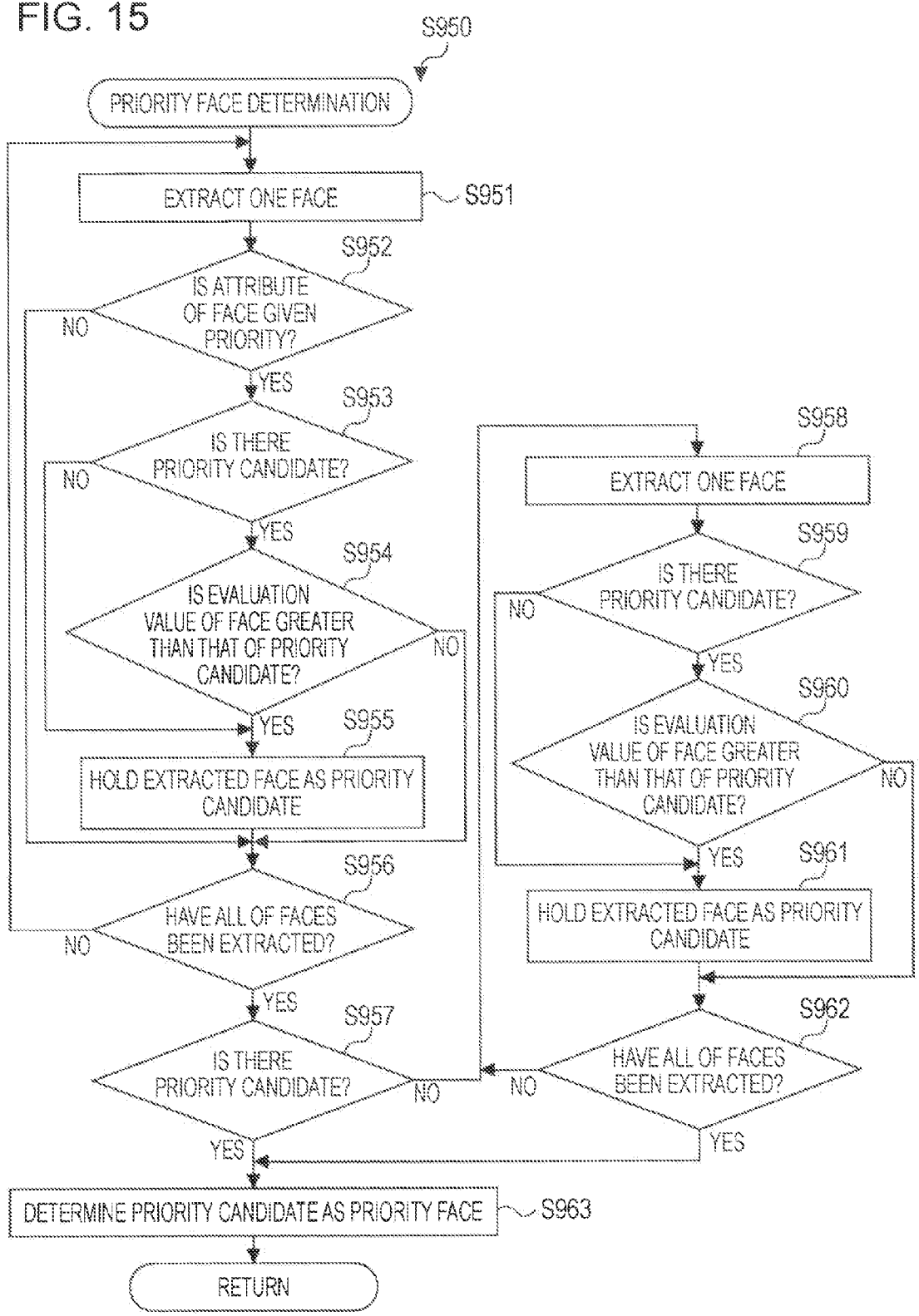
FIG. 15 is a flowchart showing a process for priority face determination in the process for imaging control by the imaging apparatus 100 according to the embodiment of the present invention.

FIG. 15 is a flowchart showing a process for priority face determination (step S950 in FIG. 12) in the process for imaging control by the imaging apparatus 100 according to this embodiment of the present invention.

First, the priority face determination unit 160 extracts one face from one or more faces included in the results of determinations output from the attribute determination unit 150 (step S951). Subsequently, the priority face determination unit 160 determines whether an attribute of the extracted face is given priority (step S952). In other words, the priority face determination unit 160 determines whether the result of determination of each face attribute stored in association with the extracted face matches the held face attribute.

When the attribute of the extracted face is not given priority (NO in step S952), the extracted face does not meet a condition of a specified face attribute. Accordingly, the process proceeds to step S956. Whereas, when the attribute of the extracted face is given priority (YES in step S952), the priority face determination unit 160 determines whether a priority candidate exists (step S953).

When there is no priority candidate (NO in step S953), the priority face determination unit 160 holds the extracted face as a priority candidate (step S955). Whereas, when the priority candidate exists (YES in step S953), the priority face determination unit 160 determines, using face information blocks concerning the detected faces as evaluation values, whether the evaluation value of the extracted face is greater than that of the priority candidate (step S954). As for the evaluation value, a value representing the size, position, or orientation of the face may be used. Alternatively, a value corresponding to the combination of those parameters may be used.

When the evaluation value of the extracted face is greater than that of the priority candidate (YES in step S954), the priority face determination unit 160 deletes the currently held priority candidate and holds the extracted face as a priority candidate (step S955). Whereas, when the evaluation value of the extracted face is not greater than that of the priority candidate (NO in step S954), it is determined that the extracted face is not a priority face and the process proceeds to step S956.

Subsequently, the priority face determination unit 160 determines whether all of faces included in the results of determinations output from the attribute determination unit 150 have been extracted (step S956). If all of the faces have not yet been extracted (NO in step S956), the process is returned to step S951. Whereas, when all of the faces have already been extracted (YES in step S956), the priority face determination unit 160 determines whether there is a priority candidate (step S957).

When there is a priority candidate (YES in step S957), the priority face determination unit 160 determines the currently held priority candidate as a priority face (step S963). Whereas, when there is no priority candidate (NO in step S957), the process proceeds to step S958. In other words, if there is no priority candidate, this means that there is no face that meets the condition of the specified face attribute. Accordingly, the face information blocks concerning the detected faces are used as evaluation values to determine a priority face.

The priority face determination unit 160 extracts one face from one or more faces included in the results of determinations output from the attribute determination unit 150 (step S958). Subsequently, the priority face determination unit 160 determines whether there is a priority candidate (step S959).

When there is no priority candidate (NO in step S959), the priority face determination unit 160 holds the extracted face as a priority candidate (step S961). Whereas, when there is a priority candidate (YES in step S959), the priority face determination unit 160 determines whether the evaluation value of the extracted face is greater than that of the priority candidate (step S960).

When the evaluation value of the extracted face is greater than that of the priority candidate (step S960), the priority face determination unit 160 deletes the currently held priority candidate and holds the extracted face as a priority candidate (step S961). Whereas, when the evaluation value of the extracted face is not greater than that of the priority candidate (NO in step S960), it is determined that the extracted face is not a priority face and the process proceeds to step S962.

The priority face determination unit 160 determines whether all of faces included in the results of determinations output from the attribute determination unit 150 have been extracted (step S962). When all of the faces have not yet been extracted, the process is returned to step S958. Whereas, when all of the faces have already been extracted (YES in step S962), the process proceeds to step S963.

The case where a priority face is determined on the basis of the results of face attribute determinations has been described. A case where the imaging apparatus 100 automatically performs an imaging operation (i.e., a shooting operation) on the basis of the results of face attribute determinations will now be described below.

Figure 16:
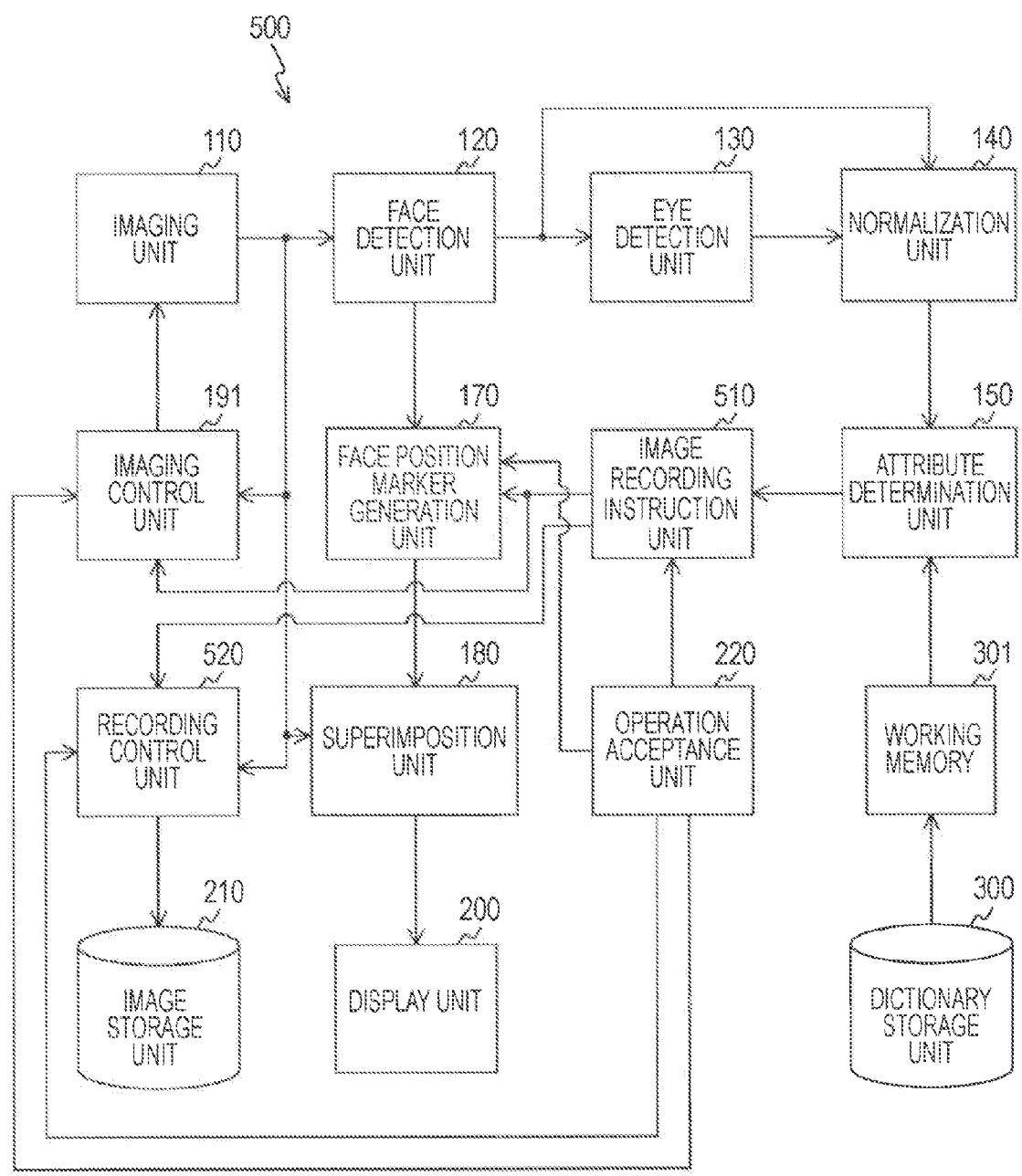
FIG. 16 is a block diagram illustrating the functional structure of an imaging apparatus 500 according to another embodiment of the present invention.

FIG. 16 is a block diagram illustrating the functional structure of an imaging apparatus 500 according to a second embodiment of the present invention. The imaging apparatus 500 is obtained by partially modifying the imaging apparatus 100 shown in FIG. 1. Specifically, the imaging apparatus 500 includes an image recording instruction unit 510 and a recording control unit 520 in place of the priority face determination unit 160 and the recording control unit 192 included in the imaging apparatus 100. In the imaging apparatus 500, it is assumed that the dictionary storage unit 300 stores a smiling-face determination dictionary, a tearful-face determination dictionary, an angry-face determination dictionary, and a mouth-opened-face determination dictionary in addition to the determination dictionaries shown in FIG. 5. Since the components other than the image recording instruction unit 510 and the recording control unit 520 in the imaging apparatus 500 are the same as those of the imaging apparatus 100 shown in FIG. 1, explanation of the other components is omitted.

The image recording instruction unit 510 instructs the recording control unit 520 when to record a captured image on the basis of a face attribute related to the type of person, i.e., an attribute deeply related to a person, such as generation or gender, and a face attribute related to facial expression, such as a smiling face or a tearful face. Specifically, the image recording instruction unit 510 determines, on the basis of the results of face attribute determinations output from the attribute determination unit 150, whether a face that meets conditions of a face attribute related to the type of person and a face attribute related to facial expression specified through the operation acceptance unit 220 exists among faces detected through the face detection unit 120. When there is a face that meets the conditions, the image recording instruction unit 510 instructs the recording control unit 520 to record the captured image. The instruction to record a captured image will be described in detail with reference to FIGS. 18 to 20.

The recording control unit 520 controls recording of a captured image output from the imaging unit 110 onto the image storage unit 210 in accordance with an instruction from the image recording instruction unit 510. Specifically, when receiving an instruction to record a captured image from the image recording instruction unit 510, the recording control unit 520 records a captured image that is output from the imaging unit 110 upon receiving the instruction onto the image storage unit 210. Since the other structure of the recording control unit 520 is the same as that of the recording control unit 192 shown in FIG. 1, description of the other structure thereof is omitted.

FIGS. 17A and 17B illustrate display examples on the liquid crystal panel 201 in accordance with the second embodiment of the present invention. FIG. 17A shows a face attribute specification window for specifying a face attribute related to the type of person. Since the face attribute specification window is the same as that shown in FIG. 3, the same components are designated by the same reference numerals and description thereof is omitted. FIG. 17B shows a facial expression specification window for specifying a face attribute related to facial expression. In the facial expression specification window, specification buttons 241 to 245 are shown. The facial expression specification window can be displayed, for example, when any of the specification buttons 231 to 235 is pressed in the face attribute specification window. The facial expression specification window and the face attribute specification window may be displayed simultaneously on the liquid crystal panel 201.

The specification buttons 241 to 245 are buttons used to specify a face attribute related to facial expression. For example, the "smiling face" specification button 241 is pressed in order to automatically record a captured image that shows a smiling face. Similarly, each of the "unsmiling face" specification button 242, the "tearful face" specification button 243, the "angry face" specification button 244, and the "mouth-opened face" specification button 245 is pressed to specify a face attribute related to facial expression corresponding to characters displayed in a display area for the button.

The second embodiment will be described with respect to a case where five specification buttons for face attributes related to facial expression are displayed and any of them is selected. Another specification button for specifying another face attribute related to facial expression may be displayed so that the other face attribute can be specified. In addition, the following description relates to a case where one face attribute related to facial expression is specified. The second embodiment of the present invention is applicable to a case where a plurality of face attributes are specified and a face that meets conditions of the specified face attributes is determined as a priority face. Note that face attributes are specified such that the face attributes are not mutually contradictory to each other. Specifying mutually contradictory face attributes is to specify, for example, "smiling face" and "unsmiling face". Similarly, a plurality of face attributes related to the type of person may be specified. In addition, a plurality of face attributes related to the type of person and a plurality of face attributes related to facial expression may be specified.

FIG. 18 illustrates an image captured through the imaging unit 110 in accordance with this embodiment of the present invention. A captured image, indicated at 700, shown in FIG. 18 is obtained by shooting a family composed of four persons, i.e., parents and children through the imaging apparatus 500. The captured image 700 shows a son 401, a father 402, a daughter 403, and a mother 404. The captured image 700 is the same as the captured image 400 shown in FIG. 7, except that the father 402 and the daughter 403 have no smile. Accordingly, detailed description of the captured image 700 is omitted.

FIG. 19 schematically shows a face-attribute determination information set 600 containing results of face attribute determinations obtained by the attribute determination unit 150 in accordance with this embodiment of the present invention. The image recording instruction unit 510 holds the face-attribute determination information set 600.

The face-attribute determination information set 600 contains identification (ID) numbers 601, attribute information "adult/child (generation)" 602, attribute information "male/female (gender)" 603, attribute information "baby/non-baby" 604, attribute information "smiling face/unsmiling face" 605, attribute information "tearful face/untearful face" 606, attribute information "angry face/non-angry face" 607, and attribute information "mouth-opened face/mouth-closed face" 608 such that each ID number is associated with the corresponding attribute information blocks. Since the ID numbers 601, the attribute information "adult/child (generation)" 602, the attribute information "male/female (gender)" 603, and the attribute information "baby/non-baby" 604 are the same as shown in FIG. 8, description thereof is omitted. The results of determinations related to the attribute information "adult/child (generation)" 602, the attribute information "male/female (gender)" 603, and the attribute information "baby/non-baby" 604 are the results of face attribute determinations related to the type of person (attributes of persons) and the results of other determinations are the results of face attribute determinations related to facial expression.

The attribute information "smiling face/unsmiling face" 605, the attribute information "tearful face/untearful face" 606, the attribute information "angry face/non-angry face" 607, and the attribute information "mouth-opened face/mouth-closed face" 608 are obtained as the results of face attribute determinations using the determination dictionaries through the attribute determination unit 150. For example, as for the attribute information "smiling face/unsmiling face" 605, attribute information indicating either "smiling face" or "unsmiling face" is stored as the result of determination on each of the faces 405 to 408 shown in FIG. 18 using the smiling-face determination dictionary. As for the attribute information "tearful face/untearful face" 606, attribute information indicating either "tearful face" or "untearful face" is stored as the result of determination on each of the faces 405 to 408 in FIG. 18 using the tearful-face determination dictionary. As for the attribute information "angry face/non-angry face" 607, attribute information indicating either "angry face" or "non-angry face" is stored as the result of determination on each of the faces 405 to 408 shown in FIG. 18 using the angry-face determination dictionary. As for the attribute information "mouth-opened face/mouth-closed face" 608, attribute information indicating either "mouth-opened face" or "mouth-closed face" is stored as the result of determination on each of the faces 405 to 408 shown in FIG. 18 using the mouth-opened-face determination dictionary.

An instruction to record a captured image showing a face that meets conditions of face attributes specified in the facial expression specification window and the face attribute specification window on the basis of the respective information blocks contained in the face-attribute determination information set 600 is given.

For example, it is assumed that the "adult" specification button 233 is pressed in the face attribute specification window shown in FIG. 17A and the "smiling face" specification button 241 is pressed in the facial expression specification window shown in FIG. 17B. In this case, when a face associated with "adult" as the attribute information "adult/child (generation)" 602 and "smiling face" as the attribute information "smiling face/unsmiling face" 605 is detected from the face-attribute determination information set 600, the image recording instruction unit 510 transmits an instruction to record a captured image to the recording control unit 520, so that the captured image is recorded.

Referring to FIG. 18, since the captured image 700 shows two adults (i.e., the father 402 and the mother 404), "adult" is stored as the attribute information "adult/child (generation)" 422 associated with each of the faces of the two adults. In this case, the mother 404 has a smile and "smiling face" is stored as the attribute information "smiling face/unsmiling face" 605 associated with the mother 404 (indicated by the ID number "004"). On the other hand, since the father 402 (indicated by the ID number "002") has no smile, "unsmiling face" is stored as the attribute information "smiling face/unsmiling face" 605 associated with the father 402. Accordingly, the mother 404 that meets the conditions is detected from the face-attribute determination information set 600. Consequently, the image recording instruction unit 510 transmits an instruction to record the captured image to the recording control unit 520, so that the captured image is recorded.

Figure 20:
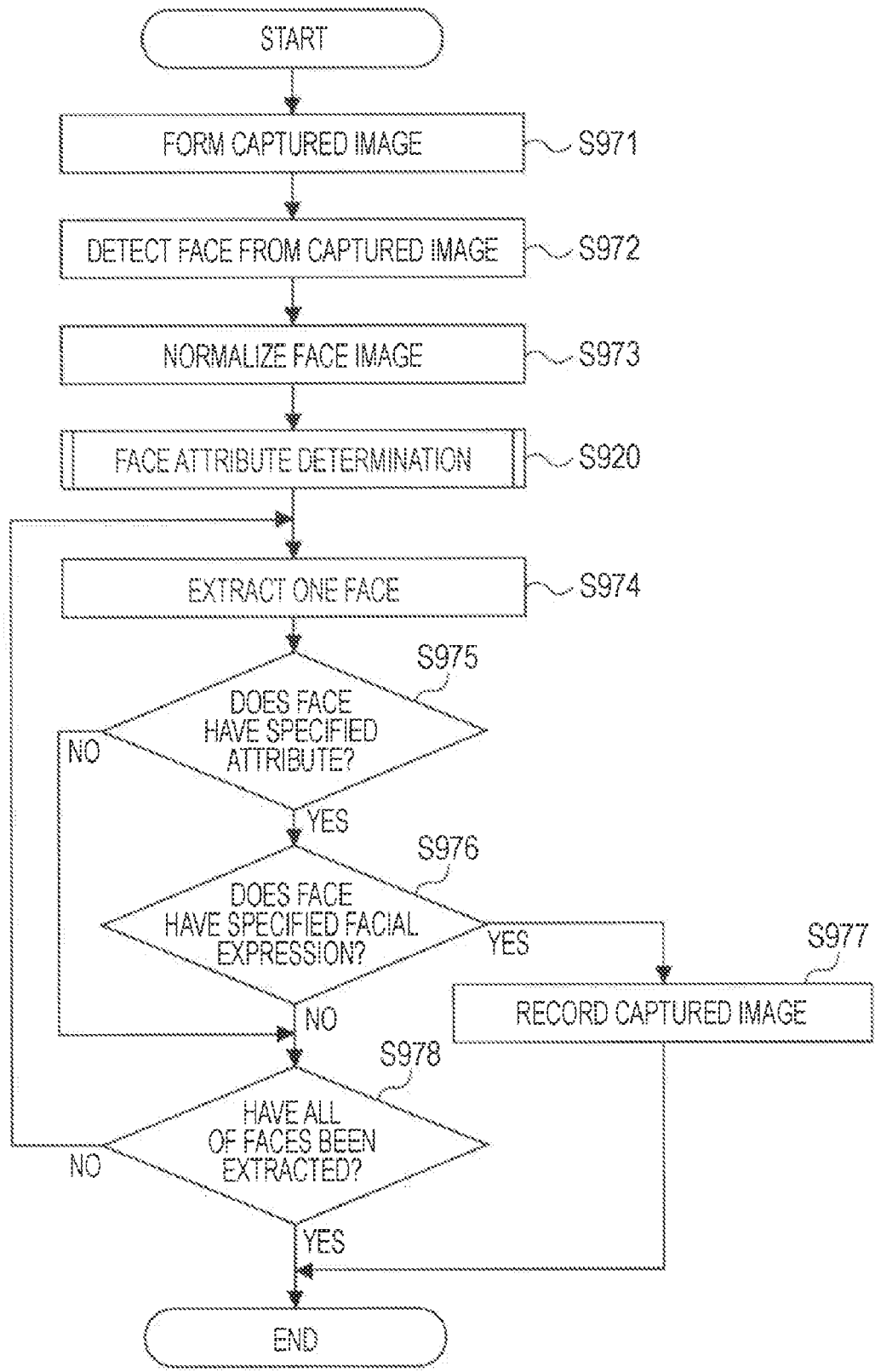
FIG. 20 is a flowchart showing a process for captured-image recording control by the imaging apparatus 500 according to the embodiment of the present invention.

FIG. 20 is a flowchart showing a process for captured-image recording control by the imaging apparatus 500 according to the second embodiment of the present invention. It is assumed that the image recording instruction unit 510 holds a face attribute related to the type of person and a face attribute related to facial expression specified through the operation acceptance unit 220. Steps S971 to S973, and S920 are the same as steps S902 to S904 and S920 in FIG. 12, explanation thereof is omitted.

The image recording instruction unit 510 extracts one face from one or more faces included in the results of determinations output from the attribute determination unit 150 (step S974). The image recording instruction unit 510 determines whether a face attribute of the extracted face matches a face attribute related to the type of person specified through the operation acceptance unit 220 (step S975). Specifically, the image recording instruction unit 510 determines whether each of the attribute information "adult/child (generation)" 602, the attribute information "male/female (gender)" 603, and the attribute information "baby/non-baby" 604 stored in the results of determinations stored in association with the extracted face matches the held face attribute related to the type of person.

When the attribute of the extracted face is not the same as the specified face attribute related to the type of person (NO in step S975), the process proceeds to step S978. Whereas, when the attribute of the extracted face matches the specified face attribute related to the type of person (YES in step S975), the image recording instruction unit 510 determines whether an attribute of the extracted face is the same as a face attribute related to facial expression specified through the operation acceptance unit 220 (step S976). Specifically, the image recording instruction unit 510 determines whether each of the attribute information "smiling face/unsmiling face" 605, the attribute information "tearful face/untearful face" 606, the attribute information "angry face/non-angry face" 607, and the attribute information "mouth-opened face/mouth-closed face" 608 in the results of determinations stored in association with the extracted face matches the held face attribute related to facial expression.

When the attribute of the extracted face is not the same as the specified face attribute related to facial expression (NO in step S976), the process proceeds to step S978. Whereas, when the attribute of the extracted face is the same as the specified face attribute related to facial expression (YES in step S976), the image recording instruction unit 510 outputs an instruction to record the captured image to the recording control unit 520 (step S977). When receiving the instruction to record the captured image, the recording control unit 520 records the captured image that is output from the imaging unit 110 upon receiving the instruction onto the image storage unit 210.

Furthermore, the image recording instruction unit 510 determines whether all of faces included in the results of determinations output from the attribute determination unit 150 have been extracted (step S978). When all of the faces have not yet been extracted (NO in step S978), the process is returned to step S974. Whereas, when all of the faces have already been extracted (YES in step S978), the process for captured-image recording control is terminated.

As described above, according to the first embodiment of the present invention, the face of a person who has a face attribute specified in the liquid crystal panel 201 can be determined as a priority face. Consequently, various imaging parameters can be set on the basis of the priority face to record a captured image, so that the face of the person having the specified face attribute can be clearly and beautifully recorded. In addition, a priority-face position marker can be assigned to the priority face, so that a photographer can easily recognize the person determined as the priority face. Furthermore, a person other than the priority face can be displayed with a face position marker, so that the photographer can easily distinguish the priority face from the other face. For example, to shoot children against the background of adults, a photographer presses the "child" specification button 234 in the face attribute specification window and then performs a shooting operation. Consequently, the faces of the children in front of the adults can be shot more clearly and beautifully than the adults.

According to the second embodiment of the present invention, when a face having a face attribute related to the type of person and a face attribute related to facial expression specified in the liquid crystal panel 201 is detected, a captured image upon detecting can be recorded. Consequently, a picture of a person corresponding to the type of person specified by the user can be easily recorded as a captured image such that the person has the user's favorite facial expression. For example, to shoot children with smiling faces against the background of adults, the user presses the "child" specification button 234 in the face attribute specification window, further presses the "smiling face" specification button 241 in the facial expression specification window, and then performs a shooting operation. Consequently, although the operation of recording a captured image is not performed even when the adults in the background smile, the operation of recording a captured image can be automatically performed when the children smile. In other words, a captured image meeting the user's preference can be easily recorded.

The first and second embodiments of the present invention have been described with respect to the case where a determination is made with respect to the face attributes "adult/child (generation)", "male/female (gender)", "baby/non-baby", "smiling face/unsmiling face", "tearful face/untearful face", "angry face/non-angry face", and "mouth-opened face/mouth-closed face". The embodiments of the present invention may be applied to a case where a determination is made as to whether a face has another face attribute. Other face attributes may be related to, for example, the positions of both eyes, the open/close states of the eyes, facial expression, ethnicity, a face shooting condition, and face orientation. The embodiments of the present invention have been described with respect to the case where the dictionary storage unit 300 stores the determination dictionaries. The embodiments of the present invention may be applied to a case where the dictionary storage unit 300 stores one determination dictionary. The embodiments of the present invention have been described with respect to the case where the respective determination dictionaries stored in the dictionary storage unit 300 are used as evaluation information sets for determinations as to whether a normalized face image is a target image. Another evaluation information set, whereby a determination can be made as to whether a normalized face image is a target image, may be used.

The embodiments of the present invention have been described with respect to the case where the face of a person shown in a captured image is detected and a face attribute associated with the detected face is determined. The embodiments of the present invention may be applied to a case where another object other than a human face is detected from a captured image and an attribute associated with the detected object is determined. Other objects other than the face of a human shown in a captured image may include, for example, the face of a pet, such as a cat or dog, the face of an animal, such as a horse or cow, and the face of a vehicle, such as a car or train.

The embodiments of the present invention have been described with respect to the case where object attributes belonging to one category are face attributes related to facial expression of a person and object attributes belonging to another category are attributes related to the type of person. The embodiments of the present invention may be applied to a case where object attributes belonging to one category are attributes related to change on the surface of an object and object attributes belonging to another category are attributes related to the type of object.

The first embodiment of the present invention has been described with respect to the case where when a plurality of priority candidates are selected and one priority face is determined from among the priority candidates. A plurality of priority candidates may be used as priority faces and imaging control, such as exposure, may be performed on the basis of the priority faces.

The first and second embodiments of the present invention have been described with respect to the imaging apparatus as an example. The embodiments of the present invention may be applied to various imaging apparatuses, such as a camcorder that captures a still image and a moving image and a mobile phone having an imaging function.

The embodiments of the present invention are examples for embodying the present invention. Although there is the correspondence between the features of the claims and the specific elements in the embodiments of the present invention, as will be described later, the present invention is not limited to the embodiments. It should be understood by those skilled in the art that various modifications, combinations, sub-combinations and alterations may occur depending on design requirements and other factors insofar as they are within the scope of the appended claims or the equivalents thereof.

The operation acceptance unit 220 corresponds to, for example, operation acceptance means according to an embodiment of the present invention. The imaging unit 110 corresponds to, for example, imaging means according to the embodiment. The face detection unit 120 corresponds to, for example, object detection means according to the embodiment. The attribute determination unit 150 corresponds to, for example, attribute determination means according to the embodiment.

The priority face determination unit 160 corresponds to, for example, priority object determination means according to the embodiment of the present invention.

The imaging control unit 191 corresponds to, for example, imaging control means according to the embodiment of the present invention.

The recording control unit 192 corresponds to, for example, recording control means according to the embodiment of the present invention.

The face position marker generation unit 170 corresponds to, for example, object position marker generation means according to the embodiment of the present invention. The superimposition unit 180 corresponds to, for example, superimposition means according to the embodiment. The display unit 200 corresponds to, for example, display means according to the embodiment.

The image recording instruction unit 510 corresponds to, for example, image recording instruction means according to an embodiment of the present invention.

Step S902 corresponds to, for example, an imaging step according to an embodiment of the present invention. Step S903 corresponds to, for example, an object detecting step according to the embodiment. Step S920 corresponds to, for example, an attribute determining step according to the embodiment. Step S950 corresponds to, for example, a priority object determining step according to the embodiment.

Processing steps described in each of the foregoing embodiments of the present invention may be regarded as a method including those processing steps, a program that allows a computer to execute those processing steps, or a recording medium that stores the program.

What is claimed is:

1. An imaging apparatus comprising:
    means for accepting an operation input to specify first and second attributes associated with a predetermined object, the first specified attribute belonging to a first category and the second specified attribute belonging to a second category;
    means for converting incoming light from a subject into a captured image;
    means for detecting one or more objects included in the captured image;
    means for determining first and second attributes of each detected object, the first detected attribute belonging to the first category and the second detected attribute belonging to the second category; and
    means for determining at least one of the detected objects as a priority object on the basis of the specified first and second attributes and the determined first and second attributes.

2. The apparatus according to claim 1, further comprising:
    means for setting a predetermined imaging parameter on the basis of the priority object to perform imaging control.

3. The apparatus according to claim 2, wherein the means for setting sets the imaging parameter on the basis of the first specified attribute to perform the imaging control.

4. The apparatus according to claim 2, wherein the means for setting sets at least one of white balance, color balance, exposure, and focusing as the imaging parameter on the basis of the priority object to perform the imaging control.

5. The apparatus according to claim 1, further comprising:
    means for recording a captured image, converted through the means for converting upon determination of the priority object, onto a predetermined recording medium.

6. The apparatus according to claim 1, wherein
the means for determining at least one of the detected objects as a priority object determines the priority object on the basis of the specified first and second attributes and the determined first and second attributes.

7. The apparatus according to claim 1, wherein the means for determining at least one of the detected objects as a priority object selects an object that has the determined first and second attributes matching the specified first and second attributes from among the detected objects to determine the priority object.

8. The apparatus according to claim 7, wherein
the means for detecting determines at least one of the size, position, and orientation of each detected object in the captured image,
when selecting a plurality of objects, the means for determining at least one of the detected objects as a priority object determines the priority object from the selected objects on the basis of at least one of the size, position, and orientation of each object.

9. The apparatus according to claim 1, wherein
the means for detecting determines the size and position of each detected object in the captured image, and
the apparatus further comprises:
 means for generating a priority-object position marker indicative of the position of the priority object in the captured image on the basis of the size and position of the priority object;
 means for superimposing the generated priority-object position marker on the captured image; and
 means for displaying the resultant image.

10. The apparatus according to claim 9, wherein
the means for generating a priority-object position marker generates an object position marker on the basis of the size and position of each detected object, the marker indicating the position of the detected object other than the priority object in the captured image and having a mode different from that of the priority-object position marker, and
the means for superimposing superimposes the generated object position marker on the captured image.

11. The apparatus according to claim 1, wherein the object is the face of a person.

12. An imaging apparatus comprising:
means for accepting an operation input to specify first and second attributes associated with a predetermined object, the first specified attribute belonging to a first category and the second specified attribute belonging to a second category;
means for converting incoming light from a subject into a captured image;
means for detecting one or more objects included in the captured image;
means for determining first and second attributes of each detected object, the first detected attribute belonging to the first category and the second detected attribute belonging to the second category; and
means for selecting an object that has the determined first and second attributes matching the specified first and second attributes from among the detected objects and instructing to record a captured image, converted through the means for converting upon selection, onto a predetermined recording medium.

13. The apparatus according to claim 12, wherein
the means for selecting selects an object that has the determined first and second attributes matching the specified first and second attributes from among the detected objects.

14. The apparatus according to claim 12, wherein
the first category is related to change on the surface of an object, and
the second category is related to the type of object.

15. The apparatus according to claim 12, wherein
the object is the face of a person,
the first category is related to facial expression of a person, and
the second category is related to the type of person.

16. A method for controlling an imaging apparatus, the method comprising:
accepting an operation input to specify first and second attributes associated with the predetermined object, the first specified attribute belonging to a gender category or an age category and the second specified attribute belonging to a facial expression category;
converting incoming light from a subject into a captured image;
detecting one or more objects included in the captured image;
determining first and second attributes of each detected object, the first detected attribute belonging to the gender category or the age category and the second detected attribute belonging to the facial expression category; and
determining at least one of the detected objects as a priority object on the basis of the specified first and second attributes and the determined first and second attributes.

17. A non-transitory computer-readable medium including computer program instructions, which when executed by a computer, cause the computer to perform a method, the method comprising:
accepting an operation input to specify first and second attributes associated with the predetermined object, the first specified attribute belonging to a gender category or an age category and the second specified attribute belonging to a facial expression category;
converting incoming light from a subject into a captured image;
detecting one or more objects included in the captured image;
determining first and second attributes of each detected object, the first detected attribute belonging to the gender category or the age category and the second detected attribute belonging to the facial expression category; and
determining at least one of the detected objects as a priority object on the basis of the specified first and second attributes and the determined first and second attributes.

18. An imaging apparatus comprising:
an operation acceptance unit accepting an operation input to specify first and second attributes associated with a predetermined object, the first specified attribute belonging to a gender category or an age category and the second specified attribute belonging to a facial expression category;
an imaging unit converting incoming light from a subject into a captured image;
an object detection unit detecting one or more objects included in the captured image;
an attribute determination unit determining first and second attributes of each detected object, the first detected attribute belonging to the gender category or the age category and the second detected attribute belonging to the facial expression category; and a priority object determination unit determining at least one of the detected objects as a priority object on the basis of the specified first and second attributes and the determined first and second attributes.

19. An imaging apparatus comprising:

an operation acceptance unit accepting an operation input to specify first and second attributes associated with a predetermined object, the first specified attribute belonging to a gender category or an age category and the second specified attribute belonging to a facial expression category;

an imaging unit converting incoming light from a subject into a captured image;

an object detection unit detecting one or more objects included in the captured image;

an attribute determination unit determining first and second attributes of each detected object, the first detected attribute belonging to the gender category or the age category and the second detected attribute belonging to the facial expression category; and an image recording instruction unit selecting an object that has the determined first and second attributes matching the specified first and second attributes from among the detected objects and instructing to record a captured image, converted through the imaging unit upon selection, onto a predetermined recording medium.

* * * * *